US009919248B2

(12) United States Patent
Tortorella et al.

(10) Patent No.: US 9,919,248 B2
(45) Date of Patent: Mar. 20, 2018

(54) FILTRATION DEVICE AND METHOD

(75) Inventors: Stevan Paul Tortorella, Westborough, MA (US); Geraint Seymour, Cardiff (GB)

(73) Assignee: GE Healthcare UK Limited, Little Chalfont (GB)

( * ) Notice: Subject to any disclaimer, the term of this patent is extended or adjusted under 35 U.S.C. 154(b) by 746 days.

(21) Appl. No.: 13/996,706

(22) PCT Filed: Dec. 20, 2011

(86) PCT No.: PCT/EP2011/073486
§ 371 (c)(1),
(2), (4) Date: Jun. 21, 2013

(87) PCT Pub. No.: WO2012/085006
PCT Pub. Date: Jun. 28, 2012

(65) Prior Publication Data
US 2013/0270173 A1  Oct. 17, 2013

(30) Foreign Application Priority Data

Dec. 21, 2010  (GB) .................................. 1021577.0
Dec. 21, 2010  (GB) .................................. 1021595.2
(Continued)

(51) Int. Cl.
*B01L 3/00* (2006.01)
*B01D 33/01* (2006.01)
*B01D 29/11* (2006.01)

(52) U.S. Cl.
CPC ............ *B01D 33/01* (2013.01); *B01D 29/118* (2013.01); *B01L 3/00* (2013.01); *B01L 3/502* (2013.01);
(Continued)

(58) Field of Classification Search
CPC ................ B01L 3/50255; B01L 3/508; G01N 2035/00465; G01N 2035/00475; G01N 2035/00485
(Continued)

(56) References Cited

U.S. PATENT DOCUMENTS 3,814,258 A  6/1974  Ayres
3,832,141 A  8/1974  Haldopoulos
(Continued)

FOREIGN PATENT DOCUMENTS

DE   196 51 356   6/1998
EP   0 292 329    11/1988
(Continued)

OTHER PUBLICATIONS

Japanese Office Action for JP Application No. 2013-545323 dated Nov. 17, 2015 (3 pages).

*Primary Examiner* — Jill Warden
*Assistant Examiner* — Dwayne K Handy
(74) *Attorney, Agent, or Firm* — Eversheds Sutherland (US) LLP

(57) ABSTRACT

Embodiments of the present invention relate to a filtration device for use in filtration of a liquid, and disclose: a liquid receptacle having an open end and a closed end; a plunger body moveable at least partially within the liquid receptacle along an axis said axis extending between the open and closed ends, said plunger including a filtrate chamber in fluid communication with the liquid receptacle via a fluid filtering path and a filter disposed in the filtering path, and the device further including a slidable seal for inhibiting or preventing fluid flow across the seal during said plunger movement; wherein said seal includes a first skirt depending from the plunger at one end of the first skirt, said first skirt having an outer surface which in use slidably and sealingly abuts the
(Continued)

vial, and having, at least in an uncompressed state, a generally annular separation between the skirt and the plunger body, which separation extends generally parallel to the axis. A second skirt, overlapping the first skirt, is disclosed also.

13 Claims, 27 Drawing Sheets

(30) Foreign Application Priority Data

Dec. 21, 2010 (GB) .................................. 1021598.6
Jun. 28, 2011 (GB) .................................. 1110924.6

(52) U.S. Cl.
CPC ....... *B01L 3/508* (2013.01); *B01L 2200/0684* (2013.01); *B01L 2200/141* (2013.01); *B01L 2300/0681* (2013.01); *B01L 2300/0832* (2013.01); *B01L 2400/0478* (2013.01)

(58) Field of Classification Search
USPC .................... 422/422, 534, 535, 544, 547
See application file for complete search history.

(56) References Cited

U.S. PATENT DOCUMENTS

| | | | |
|---|---|---|---|
| 3,870,639 A | 3/1975 | Moore et al. | |
| 3,954,614 A | 5/1976 | Wright | |
| 3,969,250 A * | 7/1976 | Farr | B01D 33/01 210/359 |
| 4,057,499 A | 11/1977 | Buono | |
| 4,189,385 A * | 2/1980 | Greenspan | B01D 33/01 210/136 |
| 4,209,488 A | 6/1980 | Breno | |
| 4,210,623 A | 7/1980 | Breno et al. | |
| 4,643,981 A | 2/1987 | Card | |
| 4,644,807 A | 2/1987 | Mar | |
| 4,800,020 A | 1/1989 | Savas et al. | |
| 4,895,808 A * | 1/1990 | Romer | B01L 3/5082 210/662 |
| 4,960,130 A | 10/1990 | Guirguis | |
| 2003/0175167 A1* | 9/2003 | Takanori | B01L 3/502 422/534 |
| 2004/0067162 A1* | 4/2004 | Haubert | B01L 3/50215 422/548 |
| 2007/0284300 A1 | 12/2007 | Bidlingmeyer | |
| 2009/0238725 A1 | 9/2009 | Ellis et al. | |
| 2010/0089185 A1 | 4/2010 | Schliemann | |

FOREIGN PATENT DOCUMENTS

| | | |
|---|---|---|
| EP | 0 642 829 | 3/1995 |
| GB | 2 048 097 | 12/1980 |
| JP | 08-238316 | 9/1996 |
| JP | 2002-263187 A | 9/2002 |
| WO | WO 92/16295 | 10/1992 |

* cited by examiner

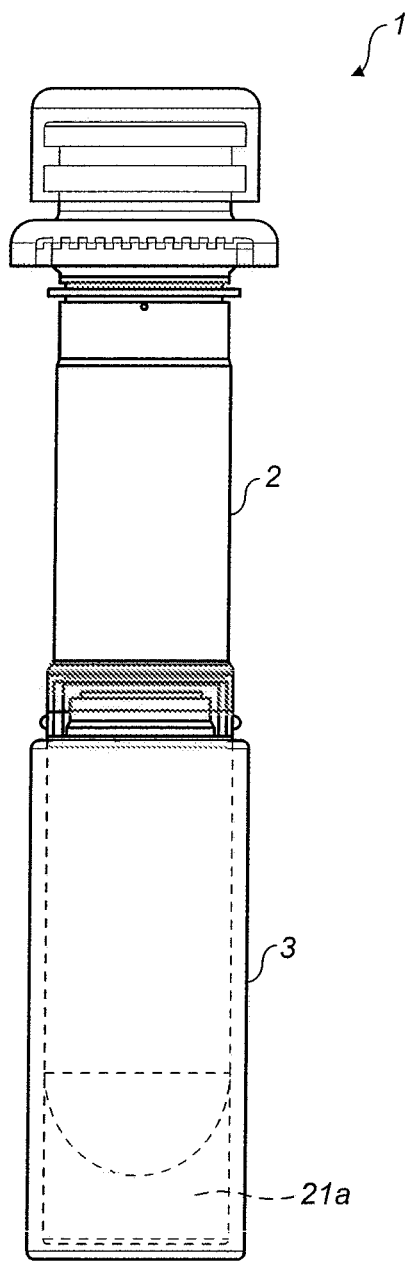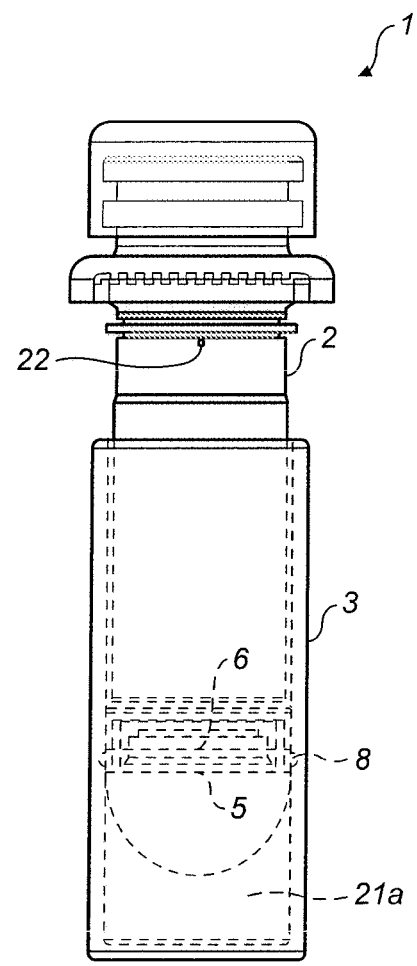
FIG. 2b
FIG. 2c

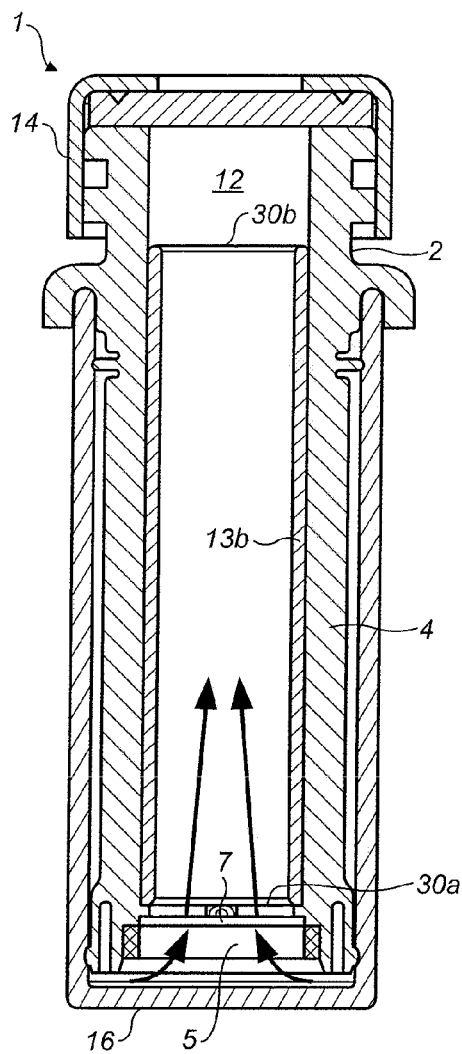
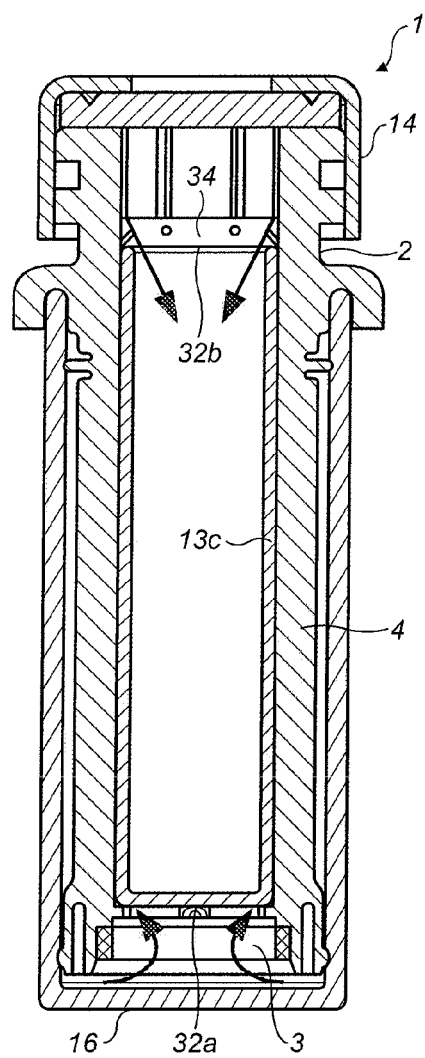
FIG. 11  FIG. 12a
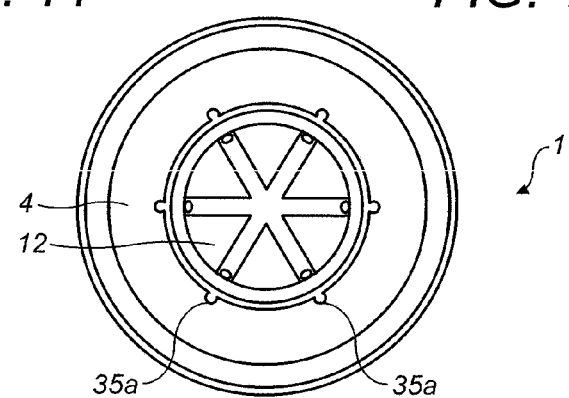
FIG. 12b

FILTRATION DEVICE AND METHOD

CROSS-REFERENCE TO RELATED APPLICATIONS

This application is a filing under 35 U.S.C. 371 of international application number PCT/EP2011/073486, filed Dec. 20, 2011, published on Jun. 28, 2012 as WO 2012/085006, which claims priority to application numbers 1021577.0 filed in Great Britain on Dec. 21, 2010, 1021598.6 filed in Great Britain on Dec. 21, 2010, 1021595.2 filed in Great Britain on Dec. 21, 2010 and 1110924.6 filed in Great Britain on Jun. 28, 2011.

FIELD OF THE INVENTION

The present invention relates to filtration devices and methods for filtering liquid samples and in particular to filtration devices in which a plunger including a filter material is inserted into a liquid receptacle such as a vial.

BACKGROUND OF THE INVENTION

Filtration devices comprising a hollow plunger which slides within a hollow tubular vial are frequently employed in laboratory and other environments to remove solids from a liquid sample. For example, biological samples such a blood, mucus or urine may be filtered (to remove contaminants or unwanted protein for example), the filtrate being subsequently used to perform medical or other tests.

In such devices, the hollow plunger typically has an aperture at one end, which is fitted with a filter membrane. The liquid sample to be filtered is initially held in the tubular vial, which is open at one end and closed at the other. The hollow plunger is inserted into the tubular vial, with a sealing contact being formed between the exterior of the hollow plunger and the interior of the tubular vial. The hollow plunger is then depressed into the tubular vial, with the sealing contact forcing the liquid sample through the filter membrane and into the interior of the hollow plunger. The filtrate is then held inside the plunger, until it is required for subsequent processing. The plunger may be fitted with a cap to prevent the filtrate escaping. When the filtrate is required, the cap may be pierced using a syringe or other device in order to extract the filtrate. U.S. Pat. No. 4,800,020 describes an example of a filtration device of this type.

The sealing contact mentioned above is typically formed by using a rigid O-ring or similar seal which is located onto the plunger body during assembly. This makes assembly of the filtration device complicated, particularly in view of the fact that such seals are typically small and difficult to handle during automated or manual assembly; further, locating grooves or other structures may be required in the plunger body, complicating the manufacture of the plunger body.

Further, in order for the sealing contact mentioned above to be effective, a relatively tight fit between the O-ring and the interior walls of the tubular vial is required; if the fit is too loose, the sealing contact becomes ineffective, allowing the liquid sample to escape around the sides of the plunger, rather than though the filter membrane. On the other hand, if the fit is too tight, the force required to push the plunger into the tubular vial may become excessive, making the device difficult to operate; furthermore, the tubular vial may break under excessive force. Accordingly, a high degree of accuracy in the external diameter formed by the O-ring and the internal diameter of the tubular vial has been required.

As a result, the tubular vial has typically been manufactured from a plastics material, since such material is relatively easy to manufacture to a high degree of accuracy (for example, by injection moulding), and is relatively resistant to breakage. However, plastics materials are often susceptible to leaching by the liquid sample, which may result in the liquid sample being contaminated with impurities from the plastics material prior to filtration, which impurities may not all be removed during the filtration process. It would therefore be desirable to use a tubular vial made of a more inert material, less susceptible to leaching by the liquid sample, such as glass. However, glass vials typically have a greater variation in internal diameter from vial to vial than plastics vials, making them unsuitable for use with the plungers described above. In addition, conventional glass vials are generally not as strong as plastics vials, particularly when subjected to expansive forces exerted by compressed plunger seals or fluids being compressed as the plunger is forced into the vial. Embodiments of the present invention at least mitigate some of the problems of the prior art.

SUMMARY OF THE INVENTION

In accordance with a first aspect of the present invention, there is provided a filtration device for use in filtration of a liquid, comprising: a liquid receptacle including an open end and a closed end; a plunger body moveable at least partially within the liquid receptacle along an axis said axis extending between said open and closed ends, said plunger including a filtrate chamber in fluid communication with the liquid receptacle via a fluid filtering path and a filter disposed in the filtering path, and the device further including a slidable seal for inhibiting or preventing fluid flow across the seal during said plunger movement; wherein said seal includes a first skirt depending from the plunger at one end of the first skirt, said first skirt including an outer surface which in use slidably and sealingly abuts the vial, and including, at least in an uncompressed state, a generally annular separation between the skirt and the plunger body, which separation extends generally parallel to the axis.

In this way, an effective seal can be provided which has a wide tolerance to different liquid receptacle sizes, and yet does not exert significant forces on the liquid receptacle when compressed within the receptacle.

In an embodiment, the plunger body, at or adjacent an end of said body which in use is closest to said closed end of said liquid receptacle, further includes a cap attached to or forming part of said body, said cap including a second skirt, depending from the cap.

Preferably said second skirt extends toward the first skirt, and preferably provides a further generally annual separation between the cap and or plunger body and the second skirt.

In an embodiment, the second skirt also has an outer sealing surface.

Preferably, said first and second skirts overlap. More preferably, at the overlap, the second skirt lies over the first skirt.

In an embodiment, the outer surfaces of the first skirt, or the second skirt, or both skirts form a substantially annular surface without protrusions.

Preferably the cap is attached to the remainder of the plunger body and clamps the filter in place when so attached.

In accordance with a second aspect of the present invention, there is provided a filtration device for use in filtration of a liquid, comprising: a liquid receptacle having an open end and a closed end; a plunger body moveable at least partially within the liquid receptacle along an axis said axis extending between the open and closed ends, said plunger including a filtered fluid receiving chamber in fluid communication with the liquid receptacle via a fluid filtering path and a filter disposed in the filtering path, and the device further including a slideable seal for inhibiting or preventing fluid flow across the seal during said plunger movement; wherein the liquid receptacle is tapered outwards at said open end.

The liquid receptacle may be formed using a blowing and/or grinding process. Preferably, the liquid receptacle is made of a glass material.

In accordance with a third aspect of the present invention, there is provided a filtration device for use in filtration of a liquid, comprising: a plunger body defining a first external cross-section at a first end of the plunger body; a filter material; and a sealing means defining a second external cross-section, the second cross-section having a dimension larger than a corresponding dimension of said first cross-section, the sealing means and the plunger body each being made from a first material, wherein at least said first end of the plunger body is insertable into a liquid receptacle having an internal cross-section with a dimension smaller than said dimension of the second external cross-section and larger than said corresponding dimension of the first external cross-section, the liquid receptacle comprising a closed end for holding a liquid, wherein the sealing means comprises a flexible portion having a thickness smaller than a thickness of a wall of the plunger body, whereby the flexible portion is more flexible than said wall of the plunger body, the flexible portion being capable of flexing on insertion into the liquid receptacle such that said second external cross-section changes so as to correspond to said internal cross-section of the liquid receptacle, whereby the filtration device is slidably movable in the liquid receptacle so that said first end moves towards the closed end of the liquid receptacle, the flexible portion exerting an outward force on an internal wall of said liquid receptacle, thereby forming a seal therewith during said movement, so as to prevent liquid held in the liquid receptacle from passing around the periphery of the filtration device during said movement, so that said movement causes said liquid to pass through said filter material.

Since filtration devices according to embodiments of the present invention comprise a sealing means having a flexible portion which can flex on insertion into a liquid receptacle, varying the cross-section that it defines, they can be used with liquid receptacles having varying internal dimensions. This makes them particularly suitable for use with liquid receptacles made from materials such as glass, which typically exhibit a large variation in internal dimensions between different receptacles. Further, since the plunger body and the sealing means are made from the same material, the filtration devices can be efficiently manufactured.

Preferably, the sealing means is integrally formed with the plunger body. The plunger body and flexible sealing means may be formed using an injection moulding process. This simplifies manufacture of the filtration device, since, because the sealing means is integrally formed with the plunger body, there is no need to assemble a separate seal, such as an O-ring, as was required in prior art devices.

In some embodiments, the flexible portion comprises one or more ribs extending outwards from the plunger body, wherein during said movement the rib can deflect longitudinally relative to said body portion, and inwards towards the body portion. Alternatively or additionally, the flexible portion may comprise a skirt extending downward from the first end of the plunger body, the skirt being deflectable inwards. Preferably, the skirt forms a wall of a recess portion, the recess portion being arranged to receive liquid during said movement so that the received liquid exerts an outward force on said skirt. These flexible portions are easily manufactured during a moulding process because they extend away from the centre of the plunger body, in the direction of flow of the mould material. Further, where a recess is used, liquid received in the recess exerts a further outward pressure on the skirt, further improving the effectiveness of the seal.

Preferably, the plunger body is tapered so as to narrow towards said first end. This prevents misalignment of the plunger body in the liquid receptacle, ensuring that the seals engage effectively.

In accordance with a fourth aspect of the present invention, there is provided a method of filtering a liquid, comprising: inserting a liquid sample into a liquid receptacle having a given internal cross-section; providing a filtration device, comprising: a plunger body defining a first external cross-section at a first end of the plunger body, the first external cross section having a dimension smaller than said given internal cross-section; a filter material; and a sealing means defining a second external cross-section, the second external cross-section having a dimension larger than said given internal cross-section, the sealing means comprising a flexible portion, the flexible portion having a thickness smaller than a thickness of a wall of the plunger body; inserting at least said first end of the plunger body and said sealing means into the liquid receptacle, thereby causing said flexible portion to flex such said second external cross-section changes so as to correspond to said internal cross-section of the liquid receptacle; and slidably moving the filtration device so that the first end moves towards the closed end of the liquid receptacle, the flexible portion exerting an outward force on an internal wall of said liquid receptacle, thereby forming a seal therewith during said movement, so as to prevent liquid held in the liquid receptacle from passing around the periphery of the filtration device during said movement, so that said movement causes said liquid to pass through said filter material.

In accordance with a fifth aspect of the present invention, there is provided a filtration device for extracting liquid from a receptacle and filtering the extracted liquid, the device comprising: a plunger body having a first external cross-section at a first end of the plunger body; a filter; and a sealing means having a second external cross-section, the second cross-section being larger than the said first cross-section, the sealing means and the plunger body being integral and made from a first material, wherein at least said first end of the plunger body is insertable into a liquid receptacle having an internal cross-section smaller than said second external cross-section and larger than said first external cross-section, wherein the sealing means comprises a flexible portion having a thickness smaller than a thickness of a wall of the plunger body, whereby the flexible portion is more flexible than said wall of the plunger body, the flexible portion being capable of flexing on insertion into the liquid receptacle such that said second external cross-section changes so as to seal to the internal surface of the liquid receptacle to prevent liquid passing between the seal and the receptacle, the filter being arranged such that said insertion causes said liquid to pass through said filter.

In accordance with a sixth aspect of the present invention, there is provided a filtration device for use in filtration of a liquid, comprising: a plunger body; a filter material; and a sealing means comprising a flexible skirt portion extending downwards from a first end of the plunger body; wherein at least said first end of the plunger body is insertable into a liquid receptacle, the liquid receptacle comprising a closed end for holding a liquid, the flexible skirt portion being capable of flexing on insertion into the liquid receptacle so as to correspond to an internal cross section of the liquid receptacle, wherein said flexible skirt portion forms a wall of a recess portion, the recess portion being arranged to receive liquid on insertion into the liquid receptacle, so that the received liquid exerts an outward force on said skirt portion, whereby the flexible skirt portion exerts an outward force on an internal wall of the liquid receptacle, thereby forming a seal therewith, on insertion into the liquid receptacle.

Filtration devices comprising a hollow plunger which slides within a hollow tubular vial are frequently employed in laboratory and other environments to remove solids from a liquid sample. For example, biological samples such a blood, mucus or urine may be filtered (to remove contaminants or unwanted protein for example), the filtrate being subsequently used to perform medical or other tests.

In such devices, the hollow plunger typically has an aperture at one end, which is fitted with a filter membrane. The liquid sample to be filtered is initially held in the tubular vial, which is open at one end and closed at the other. The hollow plunger is inserted into the tubular vial, with a sealing contact being formed between the exterior of the hollow plunger and the interior of the tubular vial. The hollow plunger is then depressed into the tubular vial, with the sealing contact forcing the liquid sample through the filter membrane and into the interior of the hollow plunger. The filtrate is then held inside the plunger, until it is required for subsequent processing. The plunger may be fitted with a cap to prevent the filtrate escaping. When the filtrate is required, the cap may be pierced using a syringe or other device in order to extract the filtrate. U.S. Pat. No. 4,800,020 describes an example of a filtration device of this type.

The filter membrane is typically held in place using a retaining ring which fits inside aperture, holding the filter membrane in place. The retaining ring may fit in the aperture by an interference or "snap" fit and/or may be ultrasonically welded to the aperture. However, such retaining rings are typically small, and difficult to correctly locate in the aperture, making manufacture difficult. Further, particularly when the retaining ring is inaccurately positioned, its attachment to the plunger can be unreliable, resulting in the filter membrane becoming dislodged, and rendering the plunger ineffective.

It is another object of the present invention to at least mitigate some of the problems of the prior art, and thus, in accordance with a seventh aspect of the present invention, there is provided a method of manufacturing a plunger assembly for use in filtering a liquid sample held in a liquid receptacle by inserting the plunger assembly into the liquid receptacle, the method comprising: providing a plunger body, the plunger body comprising a first locating means, an internal chamber and a first aperture, the first aperture being fluidly connected to the internal chamber; providing an end piece, the end piece comprising a second aperture and a second locating means corresponding to the first locating means; locating a filter material between said first aperture and said second aperture; engaging said first locating means with said second locating means, thereby attaching said filter material to said plunger body, such that the filter material is held between the first aperture and the second aperture, whereby liquid received at said second aperture can pass through the filter material to said internal chamber via the first aperture.

Thus a two-piece plunger assembly comprising a plunger body and an end piece is provided. Since the filter material is held in place by engaging respective locating means on the plunger body and end piece, the use of an internal retaining ring is avoided, and ease of assembly is improved. Further, the use of engaging means ensures that the filter material is held securely in place, reducing the risk of the filter material becoming displaced.

In some embodiments, the first locating means comprises a locating boss and the second locating means comprises a locating recess.

Preferably the end piece is attached to the plunger body using an ultrasonic welding process. An ultrasonic weld may be formed at a first position inside the first locating means and at a second position outside the first locating means. The plunger body may comprise a first energy director located at said first position and a second energy detector located at the second position. Accordingly, the end piece can be ultrasonically welded in at least two positions, further improving the security of the attachment of the filter membrane to the plunger assembly.

Alternatively or additionally, the end piece may be attached to plunger body using an interference fit and/or an adhesive.

Preferably, the method comprises forming a sealing means on said end piece, the sealing means being for forming a seal with a said liquid receptacle. Features such as seals may be formed on the end piece, enabling the end piece to have more than one piece.

In accordance with an eighth second aspect of the present invention, there is provided a plunger assembly for use in filtration of a liquid, comprising: a plunger body comprising a first locating means, an internal chamber and a first aperture, the first aperture being fluidly connected to the internal chamber; an end piece comprising a second aperture and a second locating means corresponding to the first locating means; and a filter material located between the first aperture and the second aperture, wherein the first locating means is engaged with the second locating means, thereby attaching the filter material to the plunger body, such that the filter material is held between the first aperture and the second aperture, whereby liquid received at the second aperture can pass through the filter material to the internal chamber via the first aperture.

Preferably, the first locating means comprises a locating boss and the second locating means comprises a locating recess. Preferably, the plunger body comprises a first moulded piece, and the end piece comprises a second moulded piece, the first moulded piece and the second moulded piece having being formed in separate moulding processes.

In some embodiments, the end piece comprises a sealing means for forming a seal with a liquid receptacle when inserted therein.

Preferably, the plunger body defines a first external cross-section; and the end piece comprises a sealing means defining a second external cross-section, the second cross-section having a dimension larger than a corresponding dimension of the first cross-section, wherein at least said end piece is insertable into a liquid receptacle having an internal cross-section with a dimension smaller than said dimension of the second external cross-section and larger than said corresponding dimension of the first external cross-section, the liquid receptacle comprising a closed end for holding a liquid, wherein the sealing means comprises a flexible portion capable of flexing on insertion into the liquid receptacle such that said second cross-section changes so as to correspond to said internal cross-section of the liquid receptacle, whereby the filtration device is slidably movable in the liquid receptacle so that the filter material moves towards the closed end of the liquid receptacle, the flexible portion exerting an outward force on an internal wall of said liquid receptacle, thereby forming a seal therewith during said movement, so as to prevent liquid held in the liquid receptacle from passing around the periphery of the filtration device during said movement, so that said movement causes said liquid to pass through said liquid.

Since the sealing means has a flexible portion which can flex on insertion into a liquid receptacle, varying the cross-section that it defines, plunger assemblies having such sealing means can be used with liquid receptacles having varying internal dimensions. This makes them particularly suitable for use with liquid receptacles made from materials such as glass, that typically exhibit a large variation in internal dimensions between different receptacles.

In some embodiments, the flexible portion comprises one or more ribs extending outwards from the plunger body, wherein during said movement the rib can deflect longitudinally relative to said body portion, and inwards towards the body portion.

Alternatively or additionally, the flexible portion comprises a skirt extending downward from the first end of the plunger body, the skirt being deflectable inwards. The skirt may form a wall of a recess portion, the recess portion being arranged to receive liquid during said movement so that the received liquid exerts an outward force on said skirt. Further, where a recess is used, liquid received in the recess exerts a further outward pressure on the skirt, further improving the effectiveness of the seal.

Preferably, the said plunger body is tapered so as to narrow towards said first aperture. This prevents misalignment of the plunger body in the liquid receptacle, ensuring that the seals engage effectively.

In accordance with a ninth aspect of the present invention, there is provided a filtration apparatus for filtering a liquid, comprising; a plunger assembly according to the eighth aspect of the present invention; and a said liquid receptacle, the liquid receptacle comprising an open end for receiving said plunger, the liquid receptacle being tapered outwards at said open end.

The liquid receptacle may formed using a blowing and/or grinding process. Preferably, the liquid receptacle is made of a glass material.

In accordance with a tenth aspect of the present invention, there is provided the use of a filtration apparatus according to the ninth aspect for the filtration of a liquid sample.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 2a to 2d show external views of a filtration apparatus in use according to an embodiment of the present invention;

FIG. 11 shows a side cross-sectional view of a filtration apparatus comprising a second type of filtrate receptacle for use in some embodiments of the present invention;

FIG. 12a shows a side cross-sectional view of a filtration apparatus comprising a third type of filtrate receptacle for use in some embodiments of the present invention;

FIG. 12b shows a cross-sectional view of conduit channels of a first type for use with the third type of filtrate receptacle;

DETAILED DESCRIPTION OF EMBODIMENTS OF THE INVENTION

Figure 1:
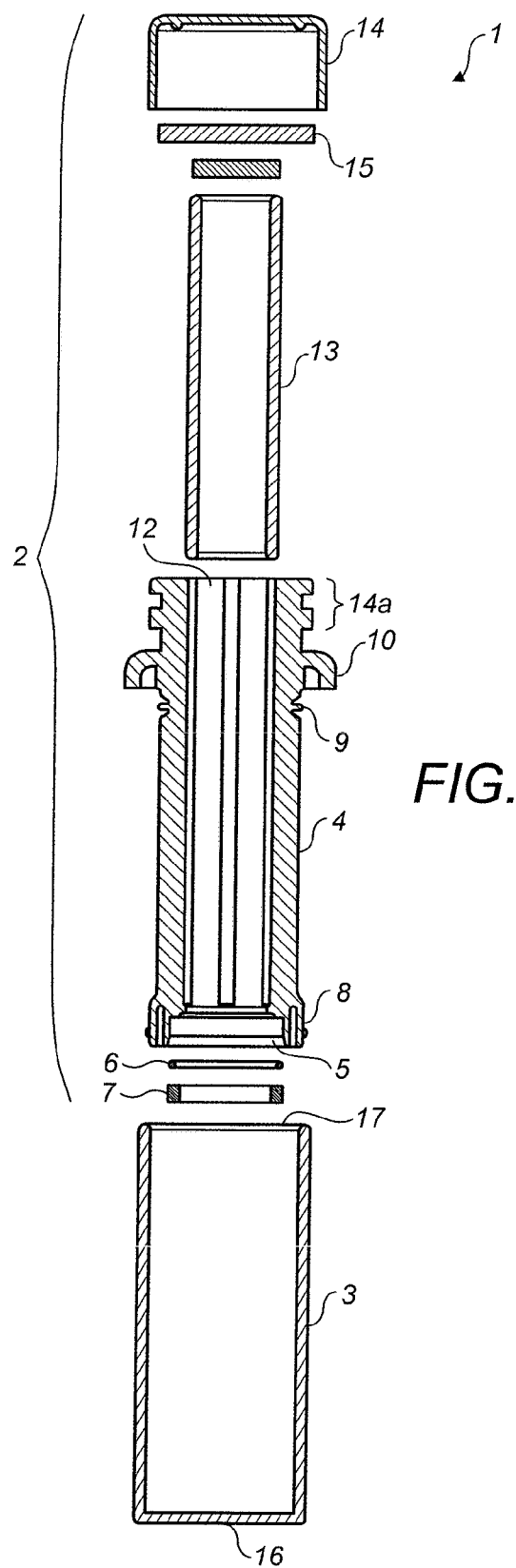
FIG. 1 shows an exploded cross-sectional view of a filtration apparatus in accordance with an embodiment of the present invention.

FIG. 1 shows an exploded cross-sectional view of a filtration apparatus 1 according to an embodiment of the invention. The filtration apparatus 1 includes a filtration device in the form of a plunger assembly 2 and a sample receptacle, in the form of a vial 3, into which a liquid sample is placed prior to filtration.

The plunger assembly 2 comprises a plunger body 4, which has an aperture 5 at one end, in which is located a filter membrane 6, which may be held in the aperture 5 by a retaining ring 7; the retaining ring may affix the filter membrane by interference fitting or snap-fitting, for example. Alternatively, ultrasonic welding could be used to fix the retaining ring 7 to the aperture 5, thereby holding the filter membrane 6 in place.

The filter membrane 6 is typically a porous membrane having a pore size selected to allow the liquid sample 21 to pass through, but to filter out unwanted particles; a typical pore size is 0.2 μm to 0.45 μm. The filter membrane 6 may be constructed from polyethersulfone (PES), nylon or polypropylene, or any other suitable material.

The plunger body 4 further comprises a liquid seal 8, a vent seal 9 and a chamber seal 10 (these parts are described in more detail below).

The plunger body 4 is hollow, and comprises a chamber 12 in its interior. A filtrate receptacle 13 is optionally located in the chamber 13 for receiving a filtered liquid sample, as described below. The plunger assembly 2 further includes a cap 14 and septa seal 15, which seal the chamber 12 at one end. The cap 14 is typically snapped onto ridges 14a on the plunger body 4. The cap 14 may alternatively or additionally be crimped to the plunger body 4 to improve the sealing properties of the cap 14.

The vial 3 is a hollow container, closed at a bottom end 16 and open at a top end 17. Herein, we use a convention in which the cap 14 is referred to as being located at the "top" of the of filtration apparatus 1, with the opposing end of the filtration apparatus 1 being referred to as the "bottom" of the filtration apparatus 1. Hence, the parts proximal to the cap 14 may be referred to as being located in the "upper" part of the filtration apparatus 1, with parts distal from the cap 14 being referred to as being located in the "lower" part of the filtration apparatus 1, and so on. This terminology is representative of a typical orientation of the filtration apparatus 1 in use and storage; however, it will be understood that the filtration apparatus 1 may be used or stored in any other orientation.

The vial 3 is typically a cylindrical tube; however, sample receptacles 3 of non-circular (for example, elliptical or square) cross-section, may also be used. The plunger body 4 has an external cross-section arranged to correspond to the internal cross-section of the vial 3, so that the former may be inserted and slidably moved in the latter. The vial 3 is typically made of an inert material, which is not susceptible to leaching by a liquid sample. For example, the vial 3 may be made from a glass material, such as an HPLC glass (for example, borosilicate 33, 51 or 55), or a ceramic material.

The plunger body 4 is typically made from a plastics material, such as Moplen EP300L or another medical grade polypropylene material, and may be manufactured using an injection moulding process. The filtrate receptacle 13 may made from an inert material, which is less susceptible to leaching by a liquid sample than the material from which the plunger body 12 is made; for example, the filtrate receptacle 13 may be made of any of the inert materials described above in relation to the vial.

The filtration apparatus 1 is typically sufficiently small to enable easy manual handling and operation. For example, the aperture 5 may have a diameter of approximately 6-7 mm or less; the walls of the plunger body 4 may have an external diameter of approximately 9-10 mm or less; the internal diameter of the vial 3 may be approximately 7.5-8.5 mm or less; the length of the plunger body may be approximately 30-35 mm or less. These dimensions are purely exemplary; filtration apparatuses 1 according embodiments of the present invention may be arranged according to any desired dimensions.

Figure 2A:
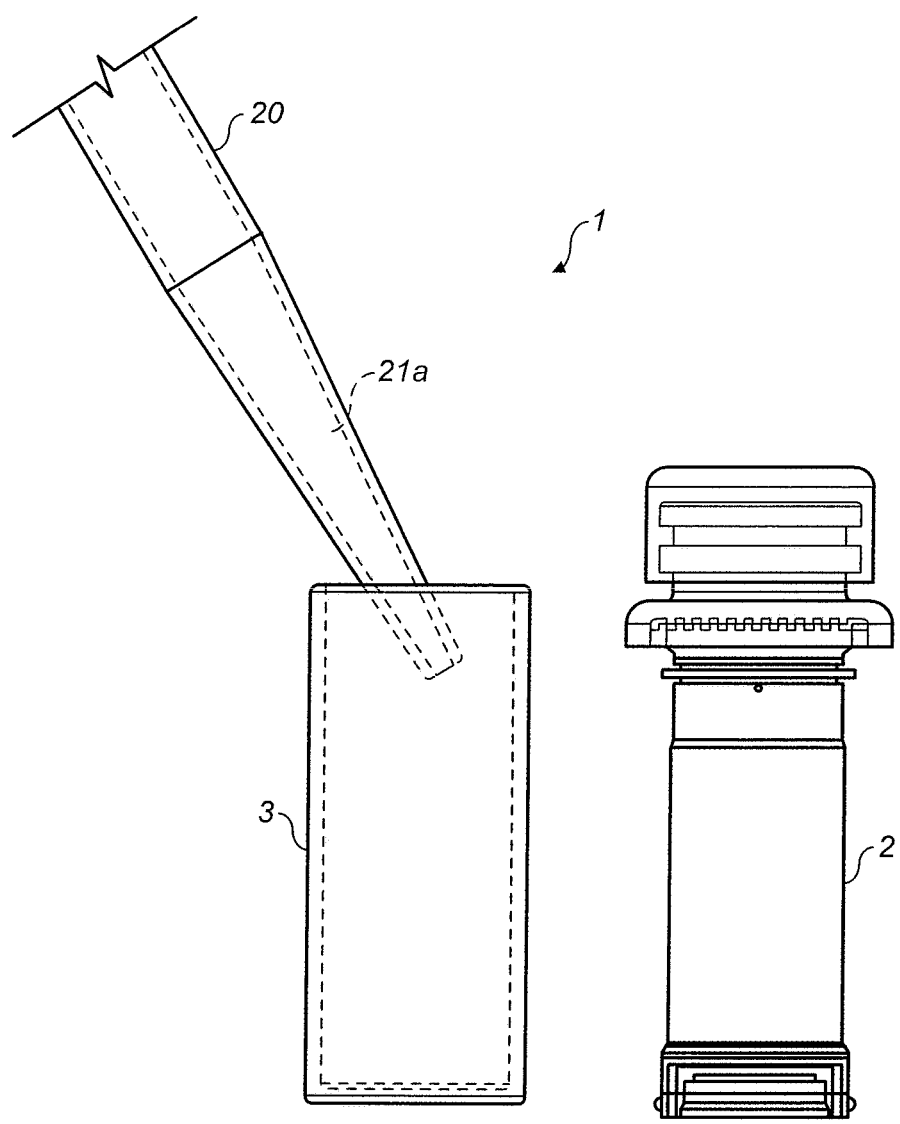

FIGS. 2a to 2d show external views of the filtration apparatus 1 at various stages of use in a filtration process according to an embodiment of the present invention. FIG. 2a shows the filtration apparatus 1 being prepared for use. A liquid sample 21a is inserted into the vial 3 using a pipette 20, for example, with the plunger assembly 2 being initially held separate from the vial 3.

Next, the plunger assembly 2 is inserted into the open end 17 of the vial 3, as shown in FIG. 2b, and depressed so that it slides within the vial 3, so that the aperture 5 moves towards the closed end 16 of the vial 3, as shown in FIG. 2c. As the plunger assembly 2 moves within the vial 3, the liquid seal 8 engages with the interior walls of the vial 3, preventing the liquid sample from escaping around the edges of the plunger assembly 2. Accordingly, the liquid sample 21a is forced through the filter membrane 6 located at the aperture 5 of the plunger assembly 2, and into the chamber 12 in the interior of the plunger assembly 2, where it is collected in the filtrate receptacle 13 or, if no filtrate receptacle is used, it is simply held in the chamber 12. A vent hole 22 is located in a side wall of the plunger body 4, allowing air to escape from the chamber 12 in the interior of the plunger assembly 2 as the liquid sample 21 enters the chamber 12 via the aperture 5.

Figure 2D:
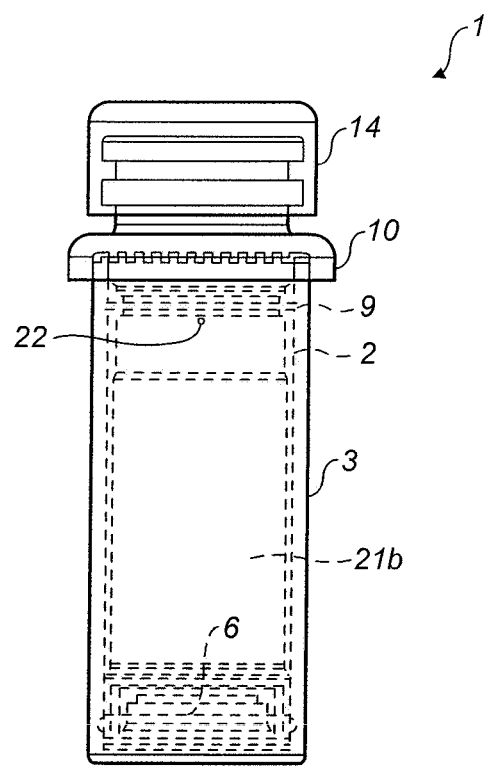

FIG. 2d shows the filtration apparatus 1 in a fully depressed state, in which the plunger assembly 2 is maximally inserted into the vial 3, and substantially all of the liquid sample 21a has passed through the filter membrane 6, and is stored as a filtrate 21b in the internal chamber 12. In this configuration, the vent seal 9 has engaged with the internal walls of the vial 3, creating an air-tight seal, and the chamber seal 10 has engaged around the neck of the vial 3, creating a further air-tight seal; these air-tight seals prevent air escaping from the filtration apparatus 1, which in turn prevents evaporation of the liquid sample 21.

The process of filtering a liquid sample 21 described above with reference to FIGS. 2a to 2d may be performed manually. Alternatively, part or all of the process may be automated.

Figure 3:
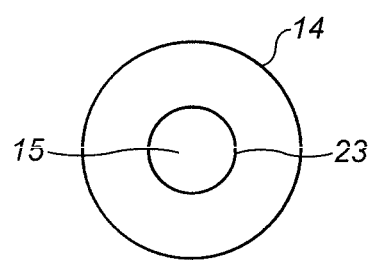
FIG. 3 shows a top view of a cap and septa seal for use in embodiments of the present invention.

The filtration apparatus 1 can be maintained in configuration shown in FIG. 2d until the filtrate 21b is required for further processing. The filtrate 21b can be accessed by piercing the septa seal 15 using, for example, a syringe. As shown in FIG. 3, which shows a top view of the cap 14, the cap 14 may have an opening 23 via which the septa seal 15 can be accessed by the syringe.

In embodiments of the present invention, a liquid seal 8 is provided having a flexible portion, which can flex to vary in cross-section, thereby accommodating different vial 3 internal diameters, whilst maintaining sufficient rigidity to exert an outwards force on the internal wall of the vial, thereby maintaining an effective seal between the filter assembly 2 and the vial. The flexible portions are made of the same material as the plunger body 4, enabling them to be efficiently manufactured. The flexible portion has a thickness less than a thickness of a wall of the plunger body 4, so that the flexible portion can flex whilst the plunger body 4 remains rigid. Examples of such flexible sealing means are now described with reference to FIGS. 4a to 6b.

Figure 4A:
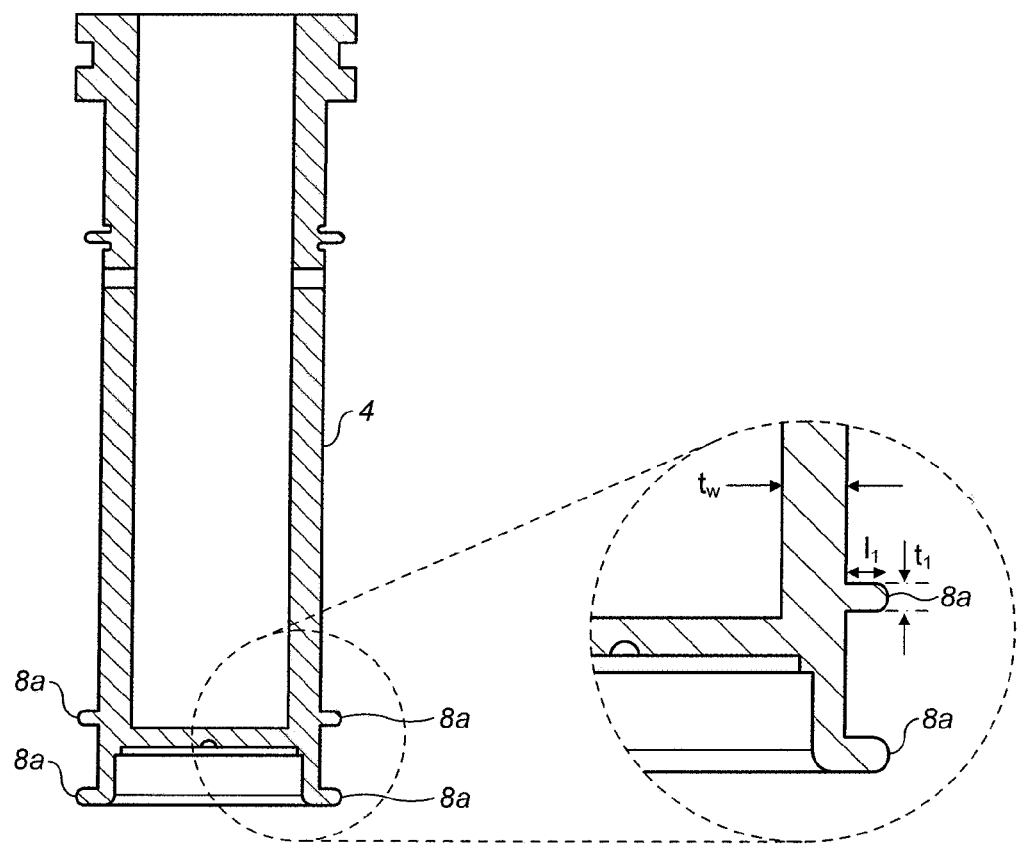
FIGS. 4a and 4b show cross-sectional views of a plunger body comprising an alternative liquid seal.
Figure 4B:
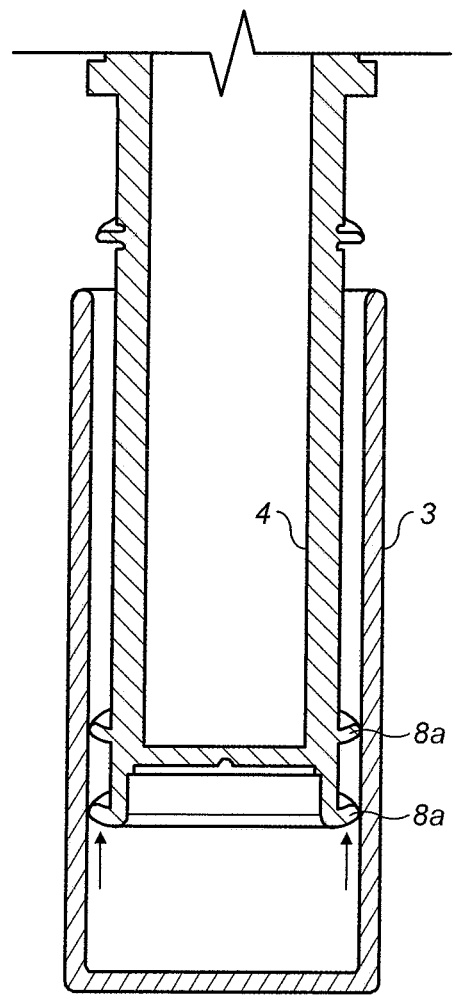

FIG. 4a shows a first liquid seal having a flexible portion in the form of one or more flexible ribs 8a located around the circumference of the plunger body 4. The flexible ribs 8a are arranged to be flexible so that, during insertion of the plunger body 4 into the vial 3, the flexible ribs 8a deflect upwards and inwards towards the plunger body 4, as shown in FIG. 4b, but also to be sufficiently rigid that when the flexible ribs 8a are deflected as shown in FIG. 4b, they exert an outward force on the internal walls of the vial 3, thereby maintaining a seal therewith. The rigidity of the ribs 8a can be adjusted by adjusting the length ($l_1$) or thickness ($t_1$) of the flexible rib 8a. The thickness ($t_1$) is arranged to be smaller than a thickness ($t_w$) of the walls of the plunger body 4 (the wall thickness $t_w$ typically being substantially uniform) so that the plunger body 4 remains rigid whilst the flexible rib 8a deflects. Although FIGS. 4a and 4b show a liquid seal comprising two flexible ribs 8a, in some embodiments of the present invention, only one flexible rib 8a is used; in other embodiments of the present invention, three or more flexible ribs 8a may be used.

Figure 5A:
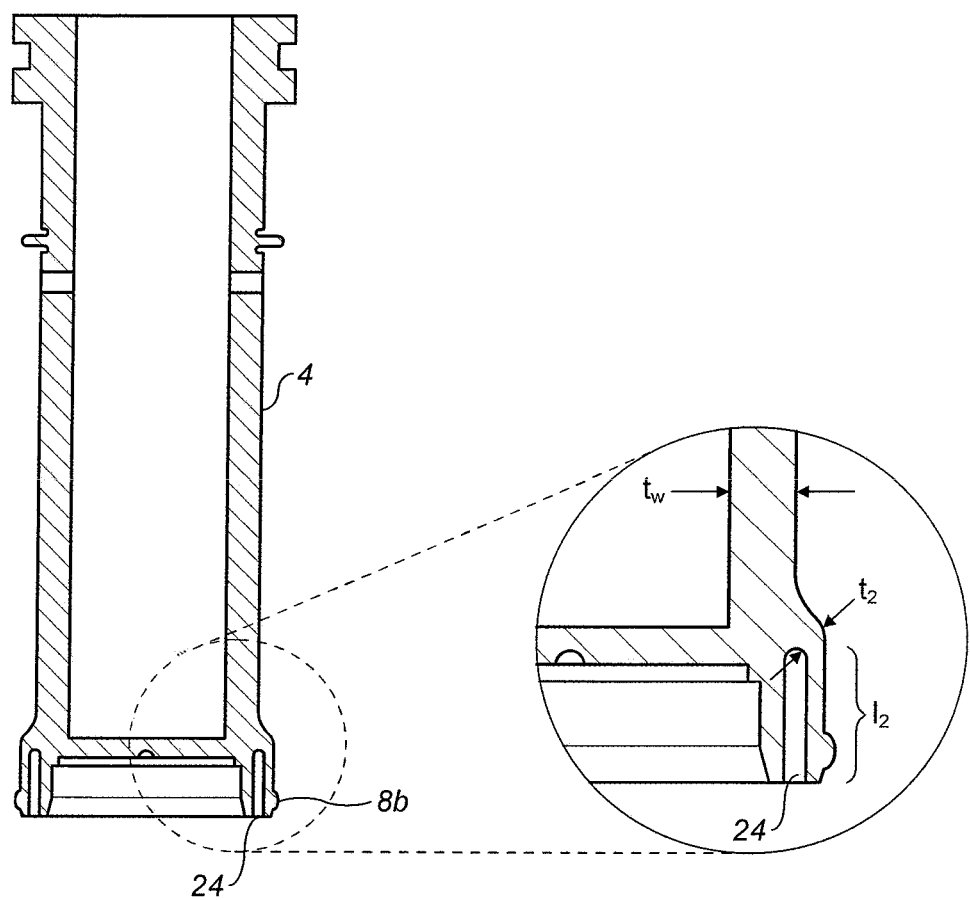
FIGS. 5a and 5b show cross-sectional views of a plunger body comprising a liquid seal in accordance with a second embodiment of the present invention.
Figure 5B:
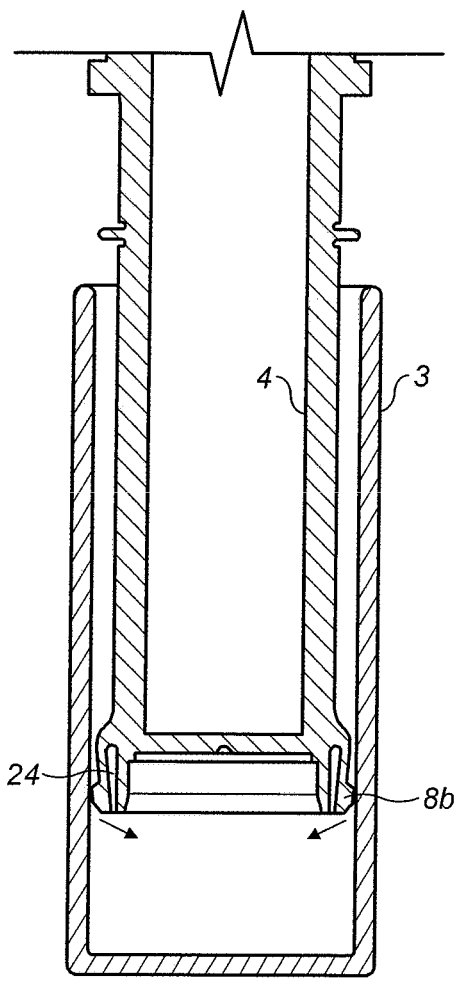

FIG. 5a shows a second liquid seal having a flexible portion in the form of a flexible skirt 8b located around the periphery of a recess 24 on the leading edge of the plunger body 4. When the plunger assembly 4 is inserted into the vial 3, the skirt 8b can flex inwards to match the internal diameter of the vial 3, as shown in FIG. 5b; as the skirt 8b flexes, it exerts an outward force on the interior wall of the vial 3, forming a seal. The rigidity of the skirt 8b can be adjusted by adjusting the length ($l_2$) or thickness ($t_2$) of the flexible rib 8a. The thickness ($t_2$) is typically arranged to be smaller than a thickness ($t_w$) of the walls of the plunger body 4 (the wall thickness $t_w$ typically being substantially uniform), so that the plunger body 4 remains rigid whilst the skirt 8b deflects inwards.

The flexible skirt 8b provides a greater area of contact between the seal 8b and the wall of the vial 3 than the flexible rib 8a described above with reference to FIGS. 4a and 4b, which provides a more effective sealing contact.

In addition, as the plunger body 4 is pushed into the vial 3, liquid is received in the recess 24, providing an outward pressure on the flexible skirt 8b, further improving the effectiveness of the seal formed by the flexible skirt 8b in contact with the inner wall of the vial 3. In this embodiment of the present invention, the strength of the liquid seal thus increases as the downward pressure exerted on the plunger assembly 4 is increased.

Figure 6A:
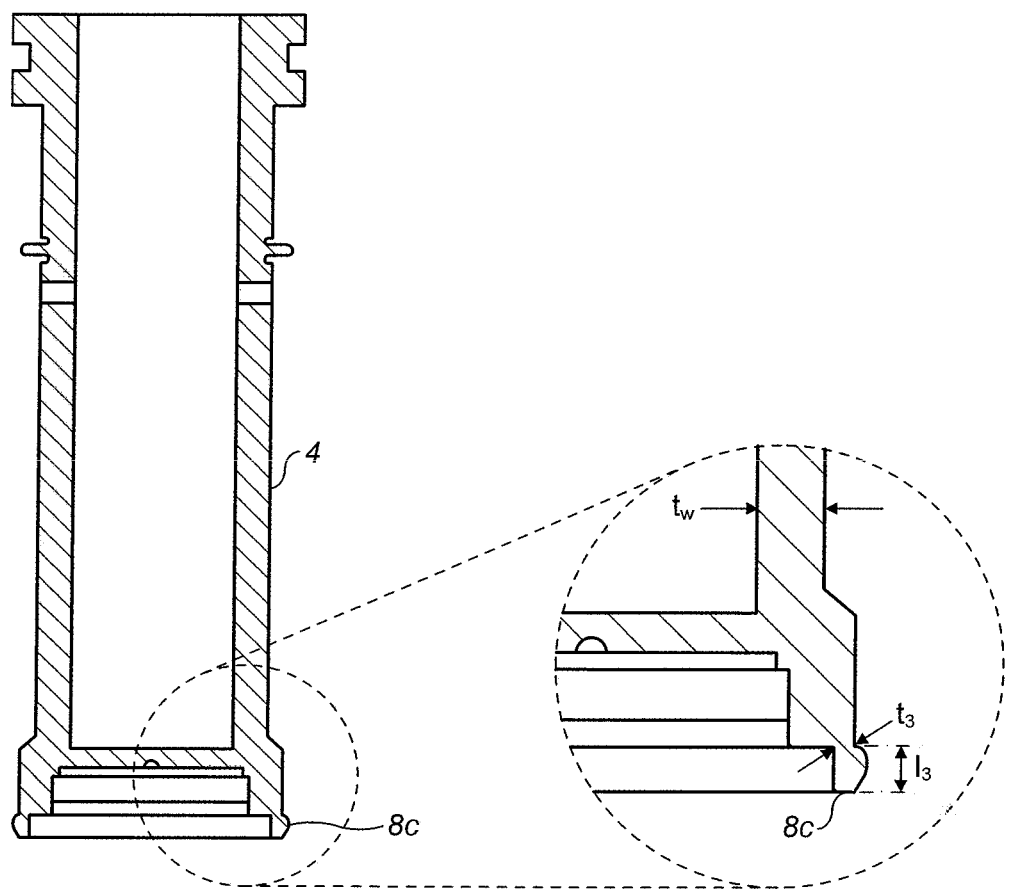
FIGS. 6a and 6b show cross-sectional views of a plunger body comprising an alternative liquid seal.
Figure 6B:
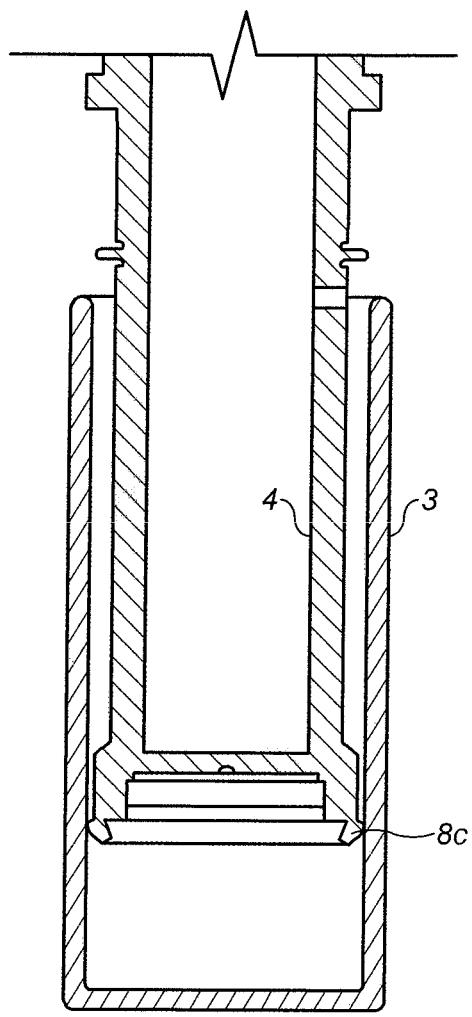

FIG. 6a shows a third liquid seal, also having a flexible portion in the form of a second flexible skirt 8c. In this embodiment, as the plunger assembly 2 is pushed into the vial 3, the second flexible skirt 8c twists (i.e. deflects) inwards to conform to the internal diameter of the vial 3, as shown in FIG. 6b; as the protrusion deflects, it exerts an outward force on the inner wall of the vial 3, thereby creating a seal. The rigidity of the second flexible skirt 8c can be adjusted by adjusting the length ($l_3$) or thickness ($t_3$) of the second flexible skirt 8c. The thickness ($t_3$) is typically arranged to be smaller than a thickness ($t_w$) of the walls of the plunger body 4 (the wall thickness $t_w$ typically being substantially uniform), so that the plunger body 4 remains rigid whilst the second flexible skirt 8c deflects inwards.

The second flexible skirt 8c provides a greater area of contact between the seal 8b and the wall of the vial 3 than the flexible rib 8a described above with reference to FIGS. 4a and 4b, which provides a more effective sealing contact.

In addition, in embodiments using the second flexible skirt 8c, no recess is required, simplifying the structure of the plunger body 4 and making it easier to manufacture than the embodiment described above with reference to FIGS. 5a and 5b.

In each of the examples described above with reference to FIGS. 4a to 6b, the liquid seal 8 is formed integrally with the plunger body 4 (for example, during an injection moulding process). Further, each of the flexible portions described above extends either outwards from the plunger body (in the case of the flexible rib 8a) or downward from the plunger body (in the case of the flexible skirts 8b, 8c); accordingly, when injection moulding, the mould parts corresponding to flexible portions 8a, 8b, 8c extend away from the plunger body 4 in the direction of flow of the injected plastic, making the flexible portions 8a, 8b, 8c easy to manufacture integrally with the plunger body 4 using injection moulding, and mitigating any requirement for subsequent processing, such as cutting of the moulded part.

Figure 7:
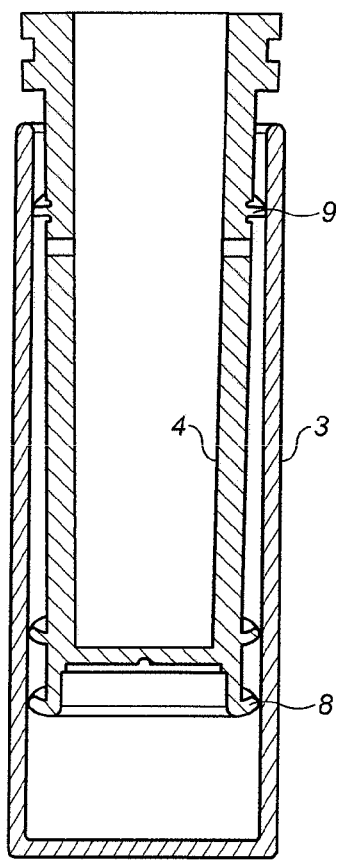
FIG. 7 shows a cross-sectional view of a tapered plunger body for use in some embodiments of the present invention.

Although the plunger body 4 may have substantially parallel walls, in some embodiments, the walls of the plunger body 4 may be tapered so as to narrow towards the aperture 5, as shown in FIG. 7. This facilitates engagement of the liquid seal 8 and vent seal 9, for the following reasons. As the plunger body 4 is inserted into the vial 3, it may be laterally offset away from the axis of the vial 3, or be inclined at an angle to the vial axis. This may result in the liquid seal 8 and/or the vent seal 9 fitting tightly with the vial 3 on one side, but fitting loosely on an opposing side; this may result in an ineffective seal contact. Tapering the plunger body 4 reduces the gap between the plunger body 4 and the vial at the top of the plunger body 4, reducing the scope for the lateral offset and/or leaning described above, thereby reducing the risk of a poor sealing contact.

Figure 8:
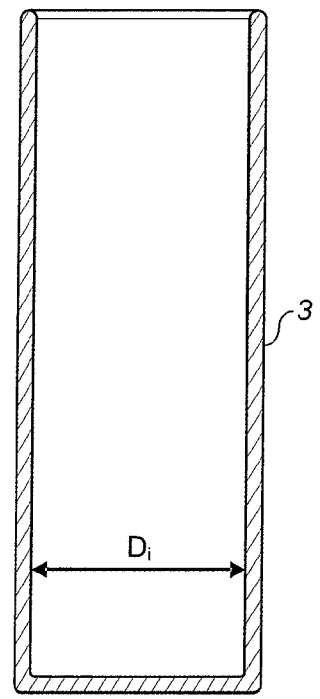
FIG. 8 shows cross-sectional views of a plunger body and liquid receptacle for use in some embodiments of the present invention.
Figure 8:
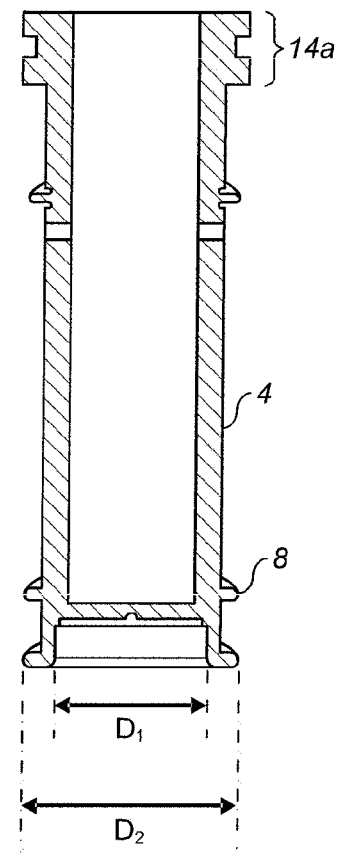

As shown in FIG. 8, the outer walls of the plunger body 4 define a cross-sectional diameter $D_1$ at the bottom of the plunger body 4 which is less than the internal diameter $D_i$ of the vial 3, whereas the cross-sectional diameter $D_2$ defined by the seal 8, in an unflexed state, is greater than the internal diameter $D_i$ of the vial 3. This ensures that the plunger body 4 can be inserted into, and sit in, the vial 3, and that the liquid seal 8 flexes on insertion into vial 3, thereby forming a seal with the vial 3. Because plunger assemblies 2 using the liquid seals 8 in accordance with embodiments of the present invention can thus accommodate different vial 3 internal diameters, it is possible to use the plunger assembly 2 with vials 3 made from a material which has exhibits a relatively high variance in internal diameter from vial to vial, such as glass.

In some embodiments, the walls of the plunger body 4 do not have a cross-sectional diameter less than the internal diameter $D_i$ of the vial along the whole length of the plunger body 4; for example, in cases where the plunger body 4 is tapered, as described above with reference to FIG. 7, the plunger body 4 walls at the top end of the plunger body 4 may define a cross-sectional diameter greater than the internal diameter of the vial 3, such that top end of the plunger body 4 remains outside the vial 3 when the plunger assembly 2 is fully depressed. The ridges 14a, which typically remain outside of the vial 3 when the plunger assembly 2 is fully depressed may also define a cross-sectional diameter greater than the internal diameter of the vial 3. Although the above discussion makes reference to "diameters" and thus assumes that the plunger body 4 and vial 3 are cylindrical, the skilled person will understand that similar considerations apply, mutatis mutandis, to other cross-sectional dimensions when the plunger body 4 and vial 3 have non-circular cross-sections (e.g. a side length in the case of a square cross-section etc.).

As mentioned above, the vial 3 may be made of glass; it may be manufactured using a glass blowing and/or grinding process.

Figure 9:
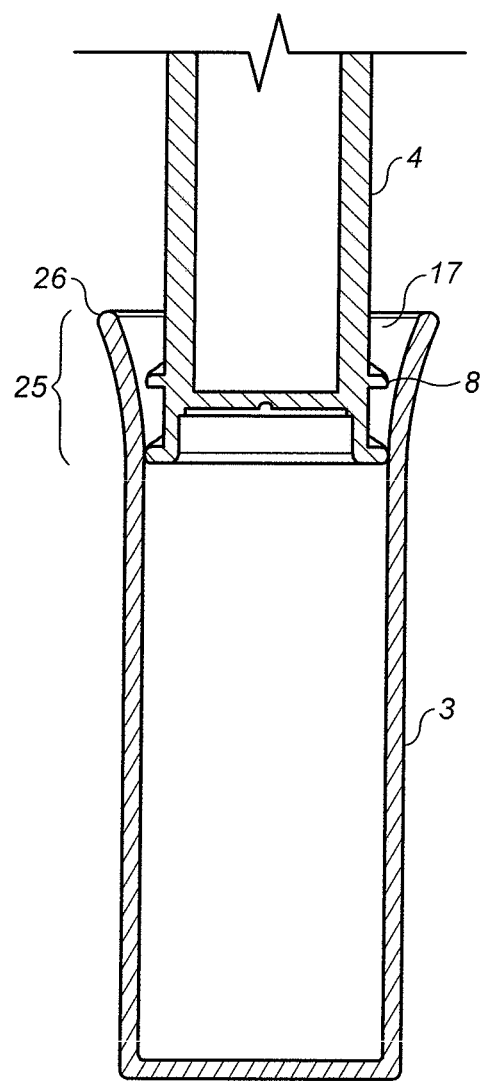
FIG. 9 shows a cross-sectional view of a liquid receptacle having a tapered portion for use in some embodiments of the present invention.

The vial 3 may comprise a tapered portion 25, so that the walls of the vial 3 taper outwards at the open end 17, as shown in FIG. 9. This ensures that the seal 8 engages with the vial 3 at a point below the rim 26 of the open end 17. This distributes the force exerted by the seal 8 over a larger effective area of the vial 3 than if the seal 8 were to engage at the rim 26. The tapered portion 46 thus protects against breakage of the vial 3.

Filtrate Receptacle

As described above, in some embodiments of the present invention, a filtrate receptacle 13 is located in the internal chamber 12 of the plunger body 4, with filtered liquid passing through the filter membrane 8 being collected in the filtrate receptacle 13. Since the filtrate 21b is held in the filtrate receptacle 13, the latter prevents the filtrate 21b from coming into contact with the plunger body 4, thereby preventing leaching of contaminants from the plunger body 4 to the filtrate 21b. The filtrate receptacle 13 is made of a different material to the plunger body 4; since filtrate receptacle can therefore be made from an inert material (i.e. a material not susceptible to leaching), the filtrate 21b can be stored for longer periods of time without becoming contaminated than is the case with prior art devices in which filtered liquid samples are held in contact with the interior of a plastic plunger.

Figure 10A:
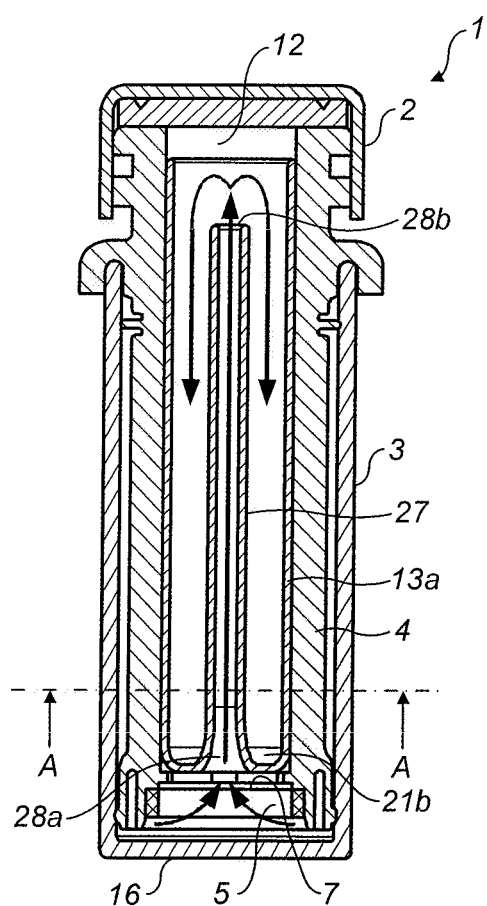
FIG. 10a shows a side cross-sectional view of a filtration apparatus comprising a first type of filtrate receptacle for use in some embodiments of the present invention.

We now turn to describing exemplary filtrate receptacles 13 for use in some embodiments of the present invention. FIG. 10a shows a cross-sectional side view of filtration apparatus 1 using a first exemplary filtrate receptacle 13a, which includes a conduit in the form of an axial capillary channel 27 extending along an axis of the filtrate receptacle 13a. Filtrate receptacles having an axial capillary channel 27 are referred to herein as "axial capillary receptacles" 13a. The axial capillary channel 27 is open at a first end 28a facing the aperture 5 of the plunger body 4, enabling it to receive liquid sample 21 from the aperture 5. The axial capillary channel 27 extends from the first end 28a along an axis in the interior of the axial capillary receptacle 13 to a second end 28b, which is also open, and is located in the interior of the axial capillary receptacle 13a. The axial capillary channel 27 thus fluidly connects the aperture 5 to the interior of the axial capillary receptacle 13a.

Figure 10B:
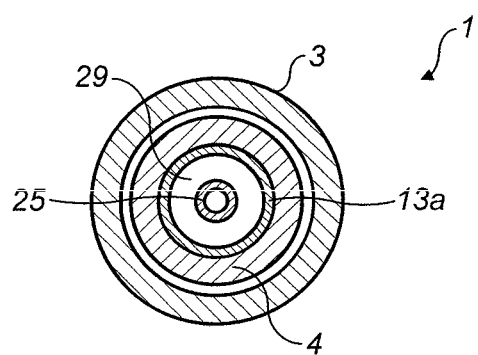
FIG. 10b shows a top cross-sectional view of a filtration apparatus comprising the first type of filtrate receptacle.

The axial capillary receptacle 13a is held tightly in place in the internal chamber 12 of the plunger body 4 using, for example, an interference fit, with the exterior walls of the axial capillary receptacle 13a forming a seal with the interior walls of the plunger body 4. Therefore, filtrate 21b passing through the filter membrane 6 as the latter moves towards the closed end 16 of the sample receptacle 3 is prevented from passing around the sides of the axial capillary receptacle 13a, and is forced through the first end 28a of the axial capillary channel 27, and along its length, as shown by the arrows in FIG. 10a. When the liquid 21b reaches the second end 28b of the axial capillary channel 27, it exits the axial capillary channel 27, and falls under the influence of gravity into the interior of the axial capillary receptacle 13a, where it collects in an annular area 29 around the periphery of the axial capillary channel 27, shown in FIG. 10b, which is a cross-sectional top view of a filtration apparatus 1 using an axial capillary receptacle 13a, taken along section A-A of FIG. 10a. The filtrate 21b is thus kept completely isolated from plunger body 4, preventing contaminants leaching into the filtrate 21b whilst the sample is stored.

FIG. 11 shows a cross-sectional side view of a filtration apparatus 1 including a second exemplary filtrate receptacle 13b for use in embodiments of the present invention. The second exemplary filtrate receptacle 13b comprises a hollow tube open at both ends 30a, 30b. Filtrate receptacles which are open at both ends are referred to herein as "hollow tube receptacles" 13b.

The hollow tube receptacle 13b is held in place in the internal chamber 12 of the plunger body 4, forming a seal with the internal walls of the plunger body 4, as described above in relation to the axial channel receptacle 13a. Therefore, as the filter membrane 6 moves towards the closed end 16 of the sample receptacle, liquid 21 passing through the filter membrane 6 moves through an open end 30a of the hollow tube receptacle 13b, located at the bottom of the hollow tube receptacle 13b facing the aperture 5, as shown by the arrows in FIG. 11. The filtrate 21b is therefore kept isolated from the interior walls of the plunger body 4, preventing leaching of contaminants from the plunger body 4. Further, since the hollow tube receptacle 13b is open and unobstructed at a top end 30b, which opposes the bottom end 30a and faces the cap 14, the filtrate 21b can be easily removed from the hollow tube receptacle 13b using a syringe, for example, as described above. This may be particularly useful in the case of automated (e.g. robotic) processing, in which insertion of a syringe may be inhibited by the use of, for example, an axial capillary channel 27.

FIG. 12a shows a cross-sectional side view of a filtration apparatus including a third exemplary filtrate receptacle 13c for use in embodiments of the present invention. The third exemplary filtrate receptacle comprises a tube having a closed end 32a located at the bottom of the filtrate receptacle 13c, facing the aperture 5, and an opposing open end 32b, located at the top of the filtrate receptacle 13c, facing the cap 14. Filtrate receptacles such as that shown in FIG. 12a which are open at one end and closed at another are referred to herein as "closed tube receptacles" 13c.

Since the closed tube receptacle 13c is closed at the end 32 facing the aperture 5, as the latter moves towards the closed end 16 of the vial 3, liquid sample passing through the aperture 5 is forced around the periphery of the closed tube receptacle 13c, as shown by the arrows in FIG. 12a. When the liquid sample 21 reaches the neck of the open end 33 of closed tube receptacle 13c it falls into the interior of the closed tube receptacle 13c under the influence of gravity; this may be facilitated by the use of a deflector ring 34, as is explained in more detail below.

Since the closed tube receptacle 13c is closed at the end 32 facing the aperture 5, the filtrate 21b is held in complete isolation from the plunger body 4; the closed tube receptacle 13c therefore provides the same advantages as the axial capillary receptacle 13a described above. Further, since the closed tube receptacle 13c is open and unobstructed at the end 33 facing the cap 14, the filtrate 21b can be easily removed from the closed tube receptacle 13c, as per the hollow tube receptacle 13b described above.

Figure 12C:
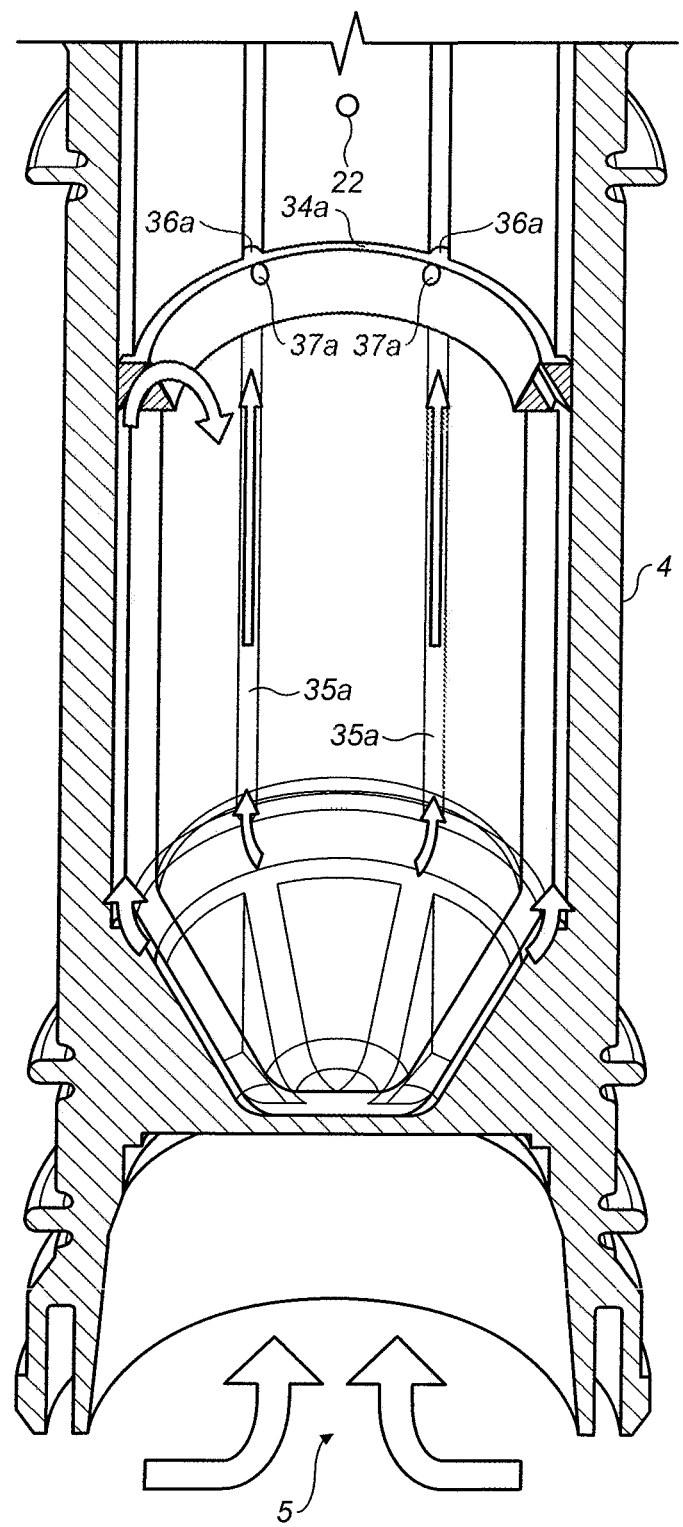
FIG. 12c shows a perspective cross-sectional view of a first plunger body for use with the third type of filtrate receptacle.

In order to facilitate passage of the filtrate 21b around the closed tube receptacle 13c, one or more conduits in the form of peripheral channels 35a formed in the walls of the chamber 12, as shown in FIG. 12b, which shows a top cross-sectional view of a plunger assembly in accordance with an embodiment of the present invention, and FIG. 12c, which shows a perspective cross-sectional view of same. The peripheral channels 35a may be formed during moulding of the plunger body 4, or they may be cut into the plunger body 4 subsequent to moulding, for example.

The closed tube receptacle 13c may be held in place in the chamber 13 by an interference fit. The filtrate 21b is thus forced through the peripheral channels 35a and around the closed tube receptacle 13c; when the filtrate 21b passes beyond the open end 32b of the closed tube receptacle 13c, it falls under the influence of gravity into the closed tube receptacle 13c, as shown in FIG. 12c.

As mentioned above, a deflector ring 34 may be used to facilitate direction of the filtrate 21b into the closed tube receptacle 13c. The exemplary deflector ring 34a shown in FIG. 12c comprises a hollow ring that has protrusions, referred to herein as "legs" 36a arranged to correspond in profile with the peripheral channels 35a. The deflector ring 34a may be fitted by interference fit into the chamber 12 of the plunger body 4, with each leg 36a fitting into a peripheral channel 35a; alternatively, or additionally, the deflector ring 34a may be ultrasonically welded to the plunger body 4.

Each leg 36a includes an opening in the form of an angled hole 37a through which filtrate 21b flowing along the peripheral channels 35a is deflected. The holes 37a direct the filtrate 21b downwards into the closed tube receptacle 13c. This separates the filtrate 21b from any air that may be travelling concurrently through the peripheral channels 35a and, in particular, prevents the filtrate 21b from moving with air travelling towards and through the vent hole 22.

Figure 12D:
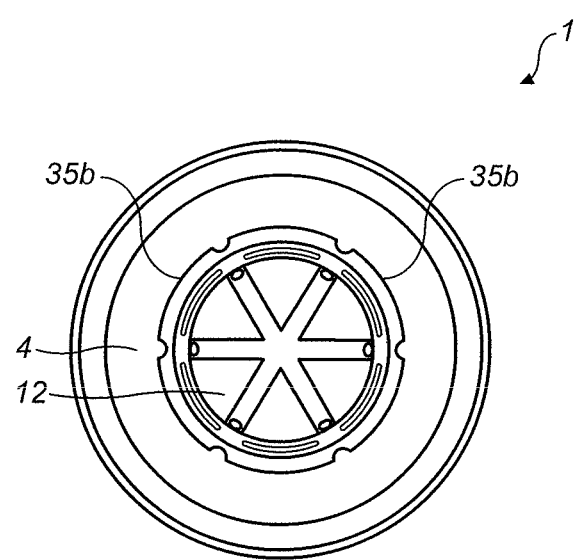
FIG. 12d shows a cross-sectional view of conduit channels of a second type for use with the third type of filtrate receptacle.
Figure 12E:
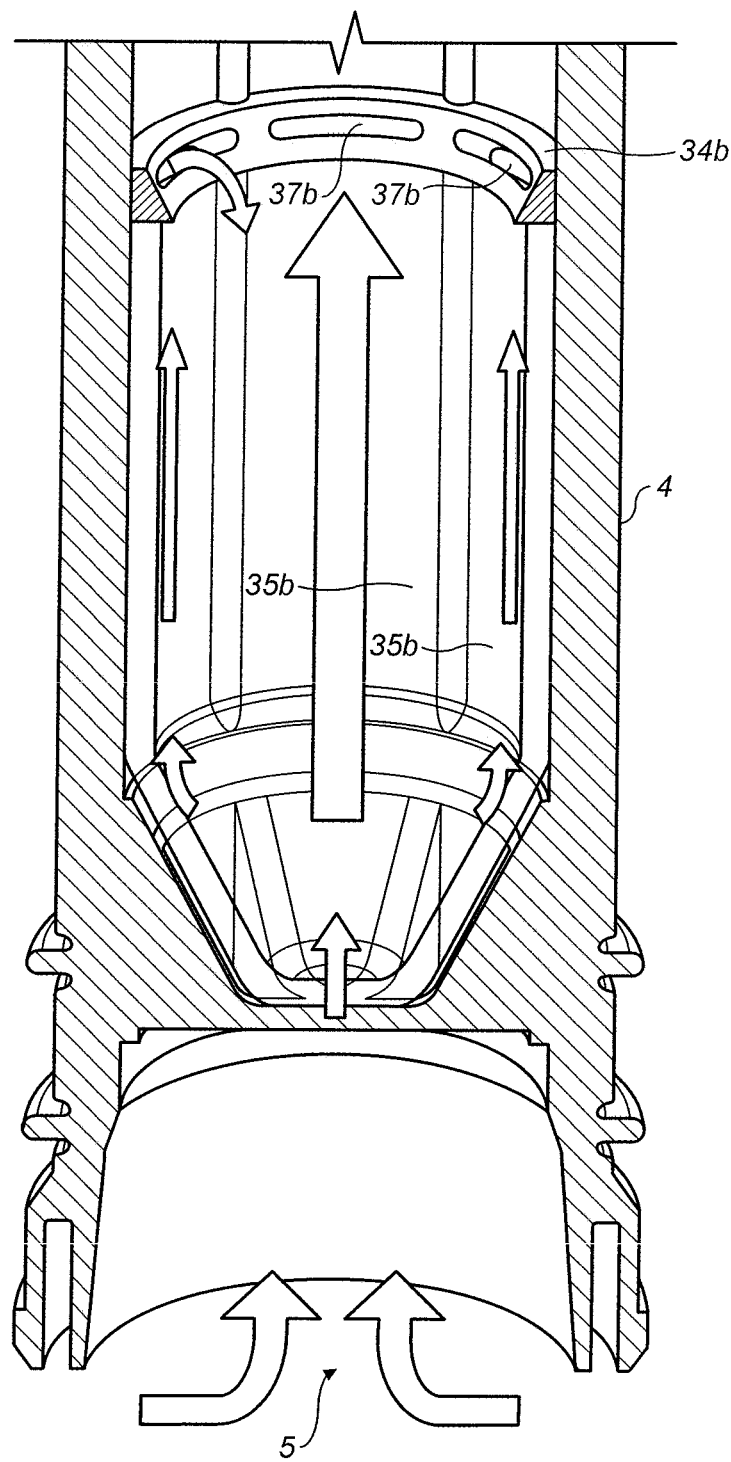
FIG. 12e shows a perspective cross-sectional view of a second plunger body for use with the third type of filtrate receptacle.

FIGS. 12d and 12e show, respectively, a top cross-sectional view and a perspective cross-sectional view of an alternative arrangement of peripheral channels 35b and deflector ring 34b, in which the peripheral channels 35b and deflector ring openings 37b have larger respective cross-sectional areas than the corresponding features of FIGS. 12b and 12c. This enables a higher rate of flow of the liquid sample 21 through the peripheral channels 35b and openings 37b, improving ease of use and increasing the speed of filtration. The deflector ring 34b may also be fitted into the chamber 12 of the plunger body 12 using an interference fit, and/or ultrasonic welding.

In addition to deflecting the flow of the liquid sample, the deflector ring 34b may also act as a stop portion, limiting the movement of the closed tube receptacle 13c in the chamber 12. In cases where no interference fit (or other means) is used to hold the closed tube receptacle 13c in place, or if the interference fit is not effective (for example, due to variation in the diameters of closed tube receptacles 13c), pressure resulting from the liquid sample 21 as it moves through the filter membrane 6 may force the closed tube receptacle 13c to move upwards towards the cap 14. If the closed tube receptacle 13c moves to the top of the chamber 12, flow of the filtrate 21b around the periphery of the closed tube receptacle 13c may be inhibited. Accordingly, the deflector ring 34 may be arranged such that any upward movement is limited by the open end 33 of the closed tube receptacle 13c abutting the deflector ring 13, ensuring that the open end 33 of the closed tube receptacle 13c remains below the openings 37 in the deflector ring 13, and that the flow of the filtrate 21b around the periphery of, and into, the closed tube receptacle is not inhibited.

Although the conduits 35a are shown formed in a side wall of the plunger body 4, it will be apparent that they could be formed as passages within the wall of the plunger body 4 have an exit adjacent the openings 37a or 37b.

Figure 12F:
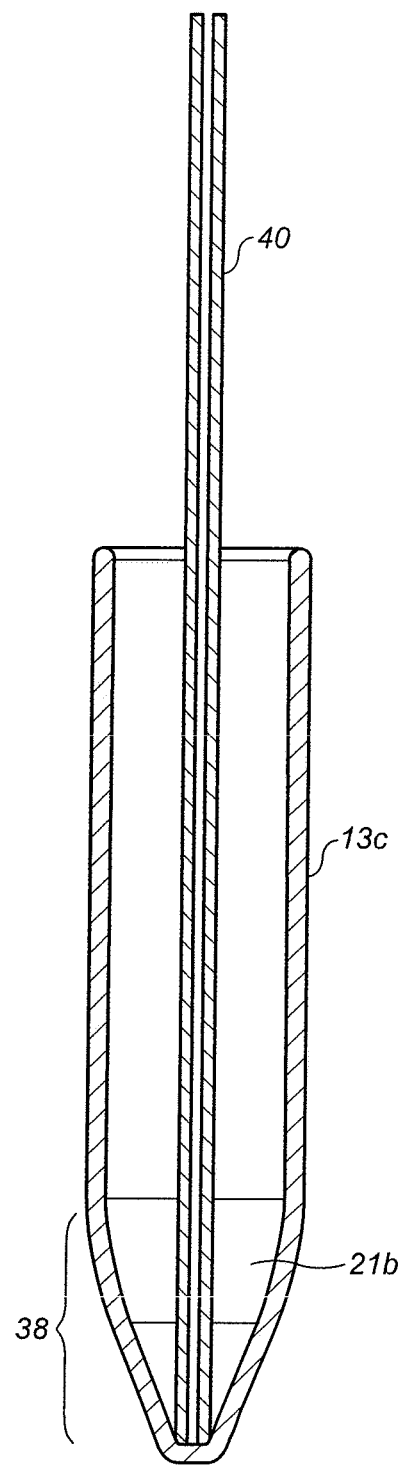
FIG. 12f shows a side cross-sectional view of a filtrate receptacle for use with either of the first and second plunger body.

The plunger chambers 12 shown in FIGS. 12b and 12e have conically shaped bases, making them suitable for use with a closed tube receptacle 13b having a conical closed end 38, as shown in FIG. 12f. This shape may be particularly suitable for removal by a syringe needle 40 of the filtrate 21b from the closed tube receptacle 21, because the reduced diameter at the conical closed end 38 focuses the syringe needle 40 and the filtrate 21b into a small aperture. A further advantage of using a closed tube receptacle 13c with a conical closed end 38 is that the conical shape facilitates the passage of the filtrate 21b around the periphery of the closed tube receptacle 13c. Alternatively, a round ended shape would also facilitate the passage of the filtrate around the periphery of the closed tube receptacle 13c.

Figure 12G:
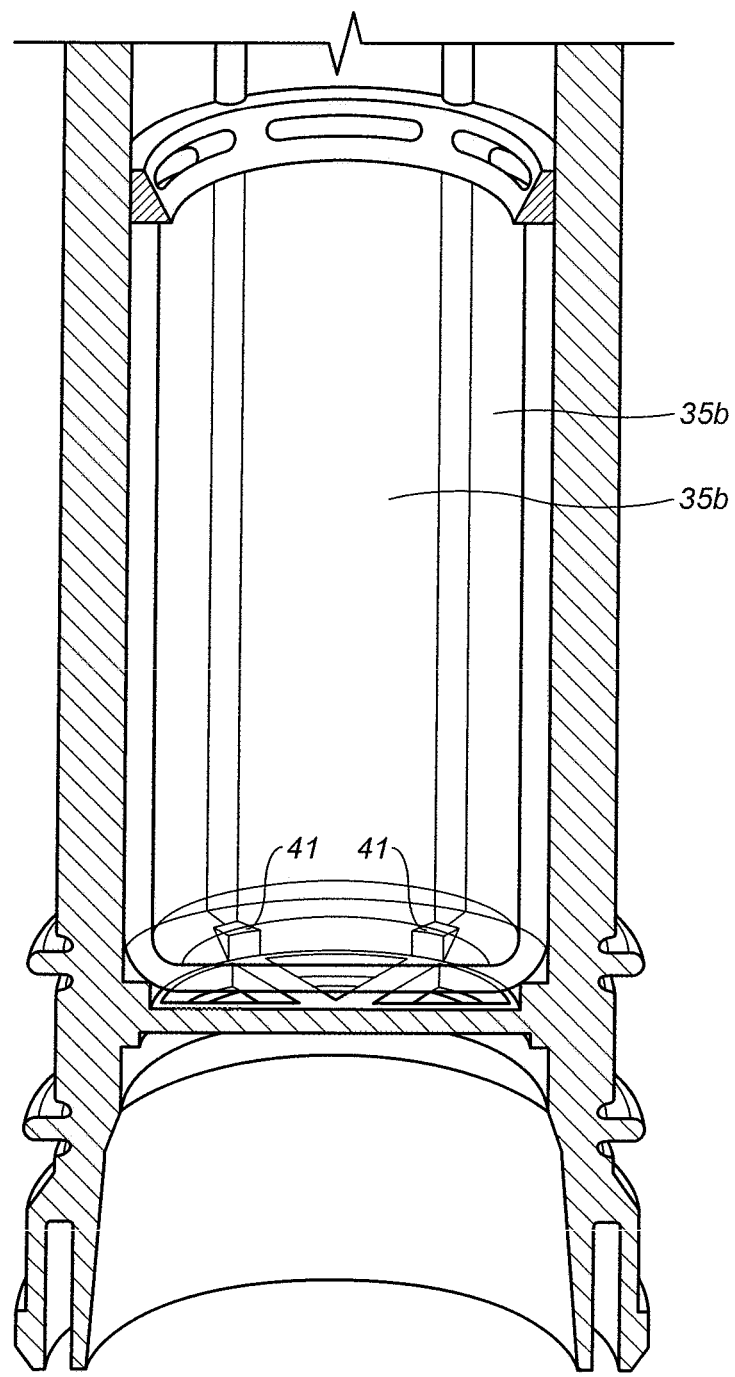
FIG. 12g shows a perspective cross-sectional view of a third plunger body for use with the third type of filtrate receptacle.

However, in some cases, it is advantageous to use a flat bottomed closed tube receptacle 13c, because this maximises the internal volume of the closed tube receptacle 13c, which in turn maximises the amount of filtrate 21b that can be stored in a single closed tube receptacle 13c. FIG. 12g shows a plunger chamber 12 having a flat base, making it suitable for use with a flat-bottomed tube receptacle 13c. In this design, the closed tube receptacle 13c is located on protrusions in the form of pillars 41 at the base of the chamber 12. The pillars 41 ensure that a gap is maintained at the closed end 32 of the closed tube receptacle 13c, through which the filtrate 21b can pass along the peripheral channels 35b.

As described above, the vent hole 22 provides an outlet through which air may escape from the chamber 12 to the exterior of the plunger assembly 2 as the latter is depressed into the vial 3; in other words, the vent hole 22 allows air pressure built up inside the chamber during depression of the plunger assembly 2 to be relieved. It is desirable to arrange the vent hole 22 such that the air may escape through it, but such that liquid sample 21 may not. In embodiments of the present invention in which a deflector ring 34 is used, this may be achieved by simply locating the vent hole 22 above the position of the deflector ring 34, as shown in FIGS. 12c, 12e and 12g.

Figure 13A:
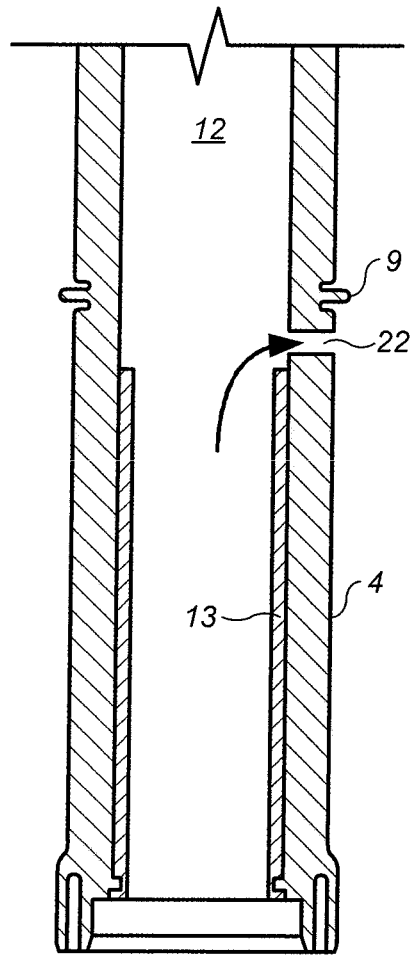
FIGS. 13a to 13c show cross-sectional views of vent hole arrangements for use in some embodiments of the present invention.

In embodiments of the present invention in which a bottom-filling filtrate receptacle 13 is used, such as the axial capillary receptacle 13a or the hollow tube receptacle 13b described above, the filtrate 21b may be prevented from passing through the vent hole 22 by similarly locating the vent hole above the upper end of the filtrate receptacle 13, as shown in FIG. 13a, in which the arrow shows the direction of travel of air as it escapes from the chamber 12.

However, the vent hole 22 must provide a point of exit from the chamber 12 located below the position of the vent seal 9 in order for the latter to be effective; accordingly, locating the vent hole 22 above the upper end of the filtrate receptacle 13 means that the size of the filtrate receptacle 13 is limited by the position of the vent seal 9 i.e. the filtrate receptacle 13 cannot occupy space in the chamber 12 above the location of the vent seal 9.

Figure 13B:
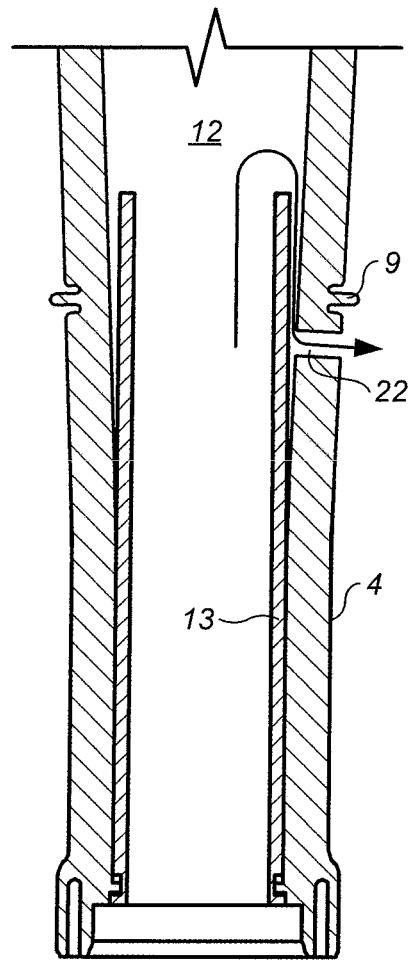

FIG. 13b shows an embodiment of the present invention arranged to address this issue; in FIG. 13b, the walls of chamber 12 are tapered so that there is a gap between the upper part of the filtrate receptacle 13 and the walls of the chamber 12 in the region of the vent hole 22. This allows air to escape through the top end of the filtrate receptacle 13, through the gap between the filtrate receptacle 13 and the chamber 12 walls, and through the vent hole 22. This enables the filtrate receptacle 13 to extend beyond the position of the vent hole 22, thereby enabling the filtrate receptacle 13 to occupy substantially all of the space within the chamber 12. In the arrangement shown in FIG. 13b, the gap between the filtrate receptacle 13 and the walls of the chamber 12 is formed due to a tapering of the chamber 12 walls; however, in some cases the gap may be formed by a tapering of the exterior walls of the filtrate receptacle 13.

Figure 13C:
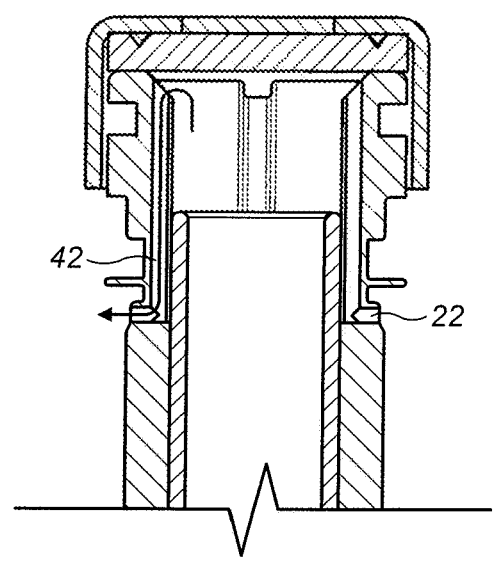

In a further embodiment of the present invention shown in FIG. 13c, an air channel 42 extends inside a wall of the chamber 12, and links the interior of chamber 12 at a position above the vent seal 9, to the vent hole 22, which is located below the vent seal 9, so that air may move from the chamber 12 to the exterior of the device, as shown by the arrow. This also enables the filtrate receptacle 13 to extend beyond the position of the vent hole 22, enabling the filtrate receptacle 13 to occupy substantially all of the space within the chamber 12.

As mentioned above, the vent seal 9 and the chamber seal 10 act, either individually or together, to seal the filtration apparatus 1 after the plunger assembly 2 is fully depressed in order to prevent evaporation of the filtrate 21b. The vent seal 9, which seals to the inner surface of the vial 3, may be thin in section and thus able to flex when the plunger assembly 2 is pushed into the vial 3; the vent seal 9 may comprise a flexible rib, as described above in relation to FIGS. 4a and 4b. This flexibility enables the vent seal 9 to fit through the open end 17 of the vial 3 and to conform to the inside wall of the vial 3, avoiding the neck of the vial 3 being subjected to an excessive force, which may cause the vial 3 to break, particularly in cases when the vial 3 is made of a glass or other rigid material.

Figure 14A:
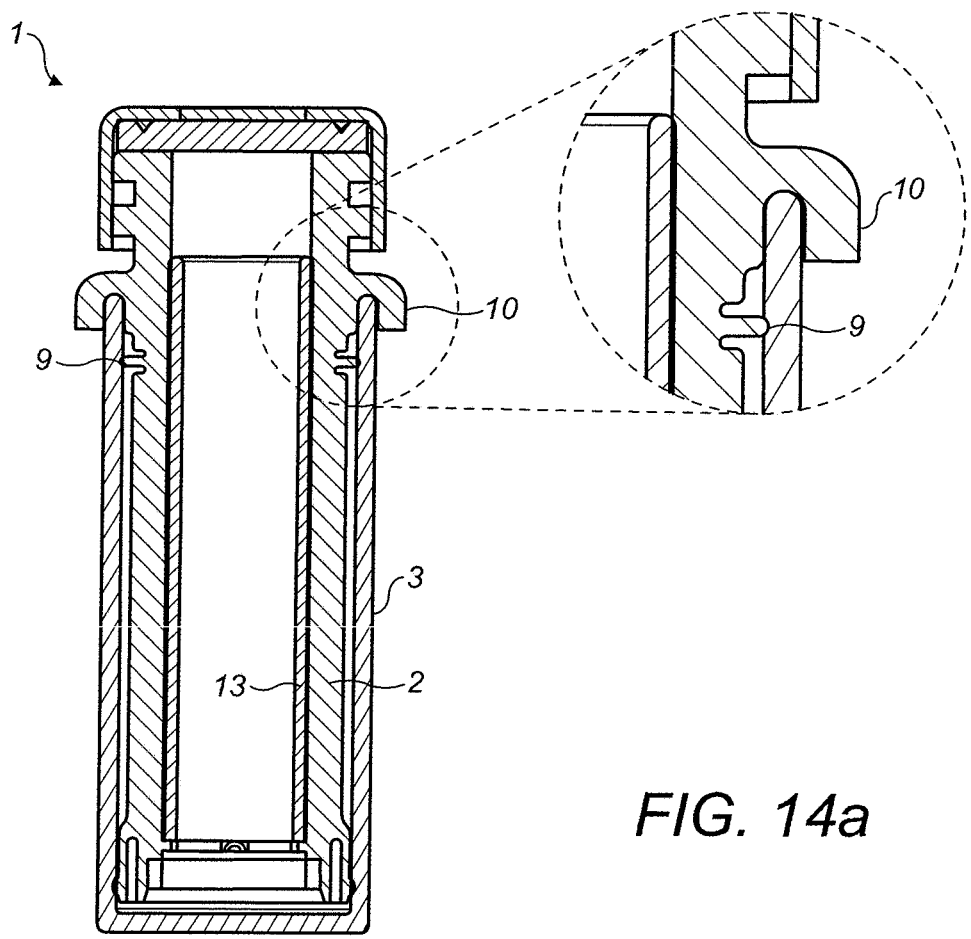
FIG. 14a shows a cross-sectional view of a chamber seal for use in some embodiments of the present invention.

FIG. 14a shows an exemplary chamber seal 10 for use in embodiments of the present invention. The chamber seal 10 is flexible and seals around the neck of the vial 3 when the plunger assembly 2 is fully depressed. There is a greater surface area of contact between the plunger assembly 2 and the vial 3, which may enables a more effective seal than is the case with the vent seal 9.

Figure 14B:
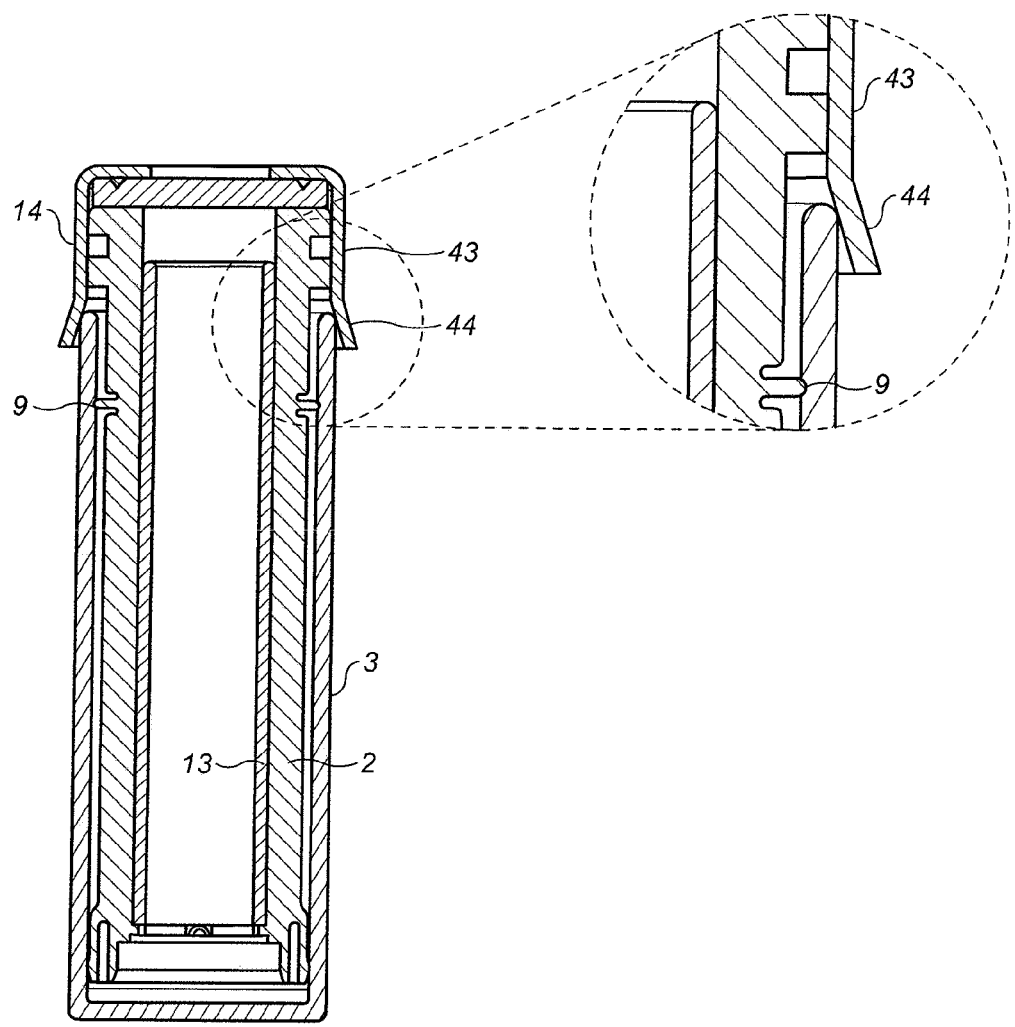
FIG. 14b shows a cross-sectional view of a cap seal for use in some embodiments of the present invention.

FIG. 14b shows a further alternative means for sealing the vent hole 22, in the form of a cap seal 43. The cap seal 43 comprises a flexible skirted area 44 extending from the cap 14. This provides a wedge fit against the top of the sample receptacle 13 and creates a seal in this area when the plunger assembly 2 is fully depressed into the vial 3. Using a cap seal 43 that is formed as part of the cap 14 avoids the necessity to mould a seal into the plunger body 4. Further, since the seal is formed on the cap, it is less prone to mould variations, and to mould flash and parting lines, than a seal formed during moulding of the plunger body 4.

Although in FIGS. 14a and 14b, the chamber seal 10 and cap seal 43 are respectively shown being used in conjunction with the vent seal 9, in some embodiments, vent seal 9 is not used. Further, in some embodiments, the vent seal 9 may be used without the use of a chamber seal 10 or cap seal 43.

Externally Fitting Filter Ring

As described above, the filter membrane 6 may be fixed in the aperture 5 by means of a retaining ring 7, which can be fitted by snap-fitting, interference fitting or ultrasonic welding, for example. However, the retaining ring 7 is typically small in size since it must fit inside the aperture 5, making it difficult to handle during assembly of the plunger assembly 2. Further, the internal fitting of the retaining ring 7 can be unreliable, resulting in the filter membrane 6 becoming dislodged, rendering the plunger assembly 2 ineffective.

Figure 15:
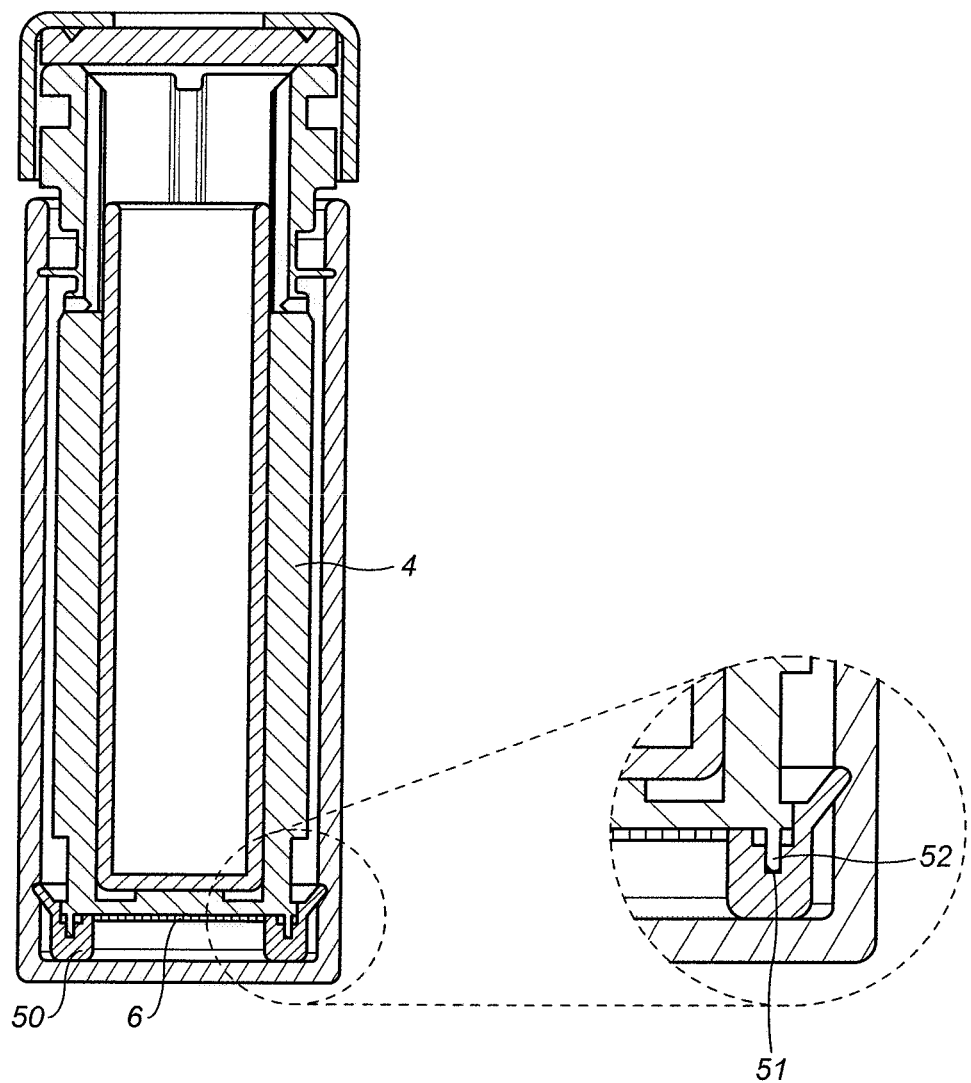
FIG. 15 shows a cross-sectional view of an externally fitting filter ring for use in embodiments of the present invention.

FIG. 15 shows an end piece, which provides an alternative to the retaining ring 7, in the form of an externally fitting filter ring 50 (referred to herein, for conciseness, simply as an "external ring" 50), which fits externally to the plunger body 4; the external ring 50 is typically a moulded component formed of the same or similar material as the plunger body. The external ring 50 has a first locating means in the form of a locating recess 51 which engages with a corresponding second locating means, in the form of a locating boss 52, on the plunger body 4, thereby holding the filter membrane 6 in place. The external ring 50 includes an aperture 55 which aligns with the plunger body aperture 5 when the locating recess 51 is fitted on the locating boss 4a, so that, in use, liquid sample 21a can pass through the external ring aperture 7b, filter membrane 6 and plunger body membrane 5 into the chamber 12 of the plunger body 4.

The external ring 50 may be held in place on the boss 52 by an interference fit between the locating recess 51 and the boss 52. Alternatively or additionally, the external ring 50 may be permanently attached to the plunger body 4 by means of an adhesive and/or an ultrasonic weld. An exemplary method of ultrasonically welding the external ring 50 to the plunger body 4 is now described with reference to FIGS. 16a to 16c.

Figure 16A:
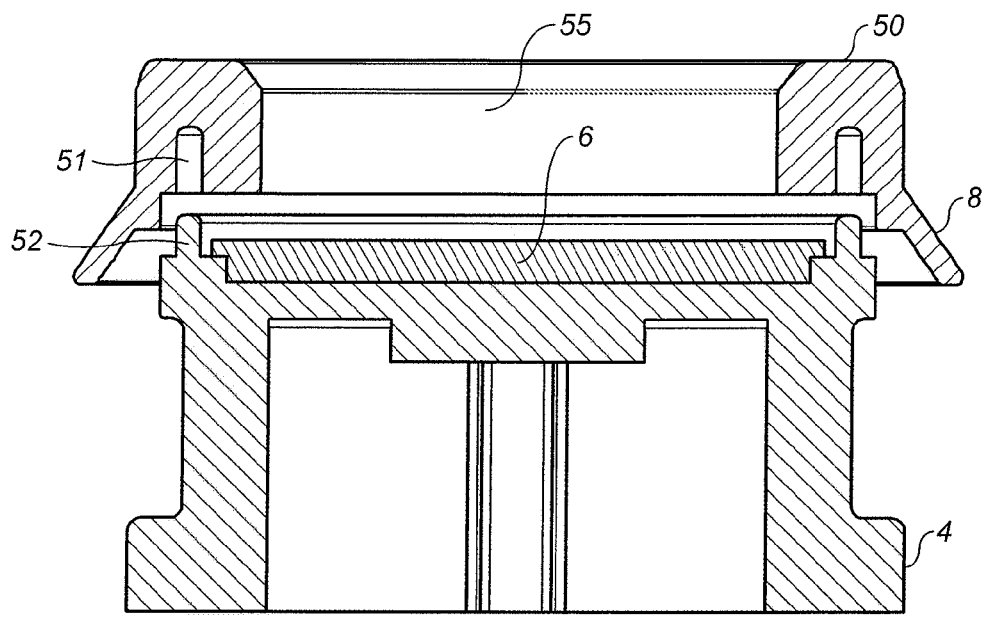
FIGS. 16a to 16c shows cross-sectional views of the externally fitting filter ring being attached to a plunger body using an ultrasonic welding process.
Figure 16B:
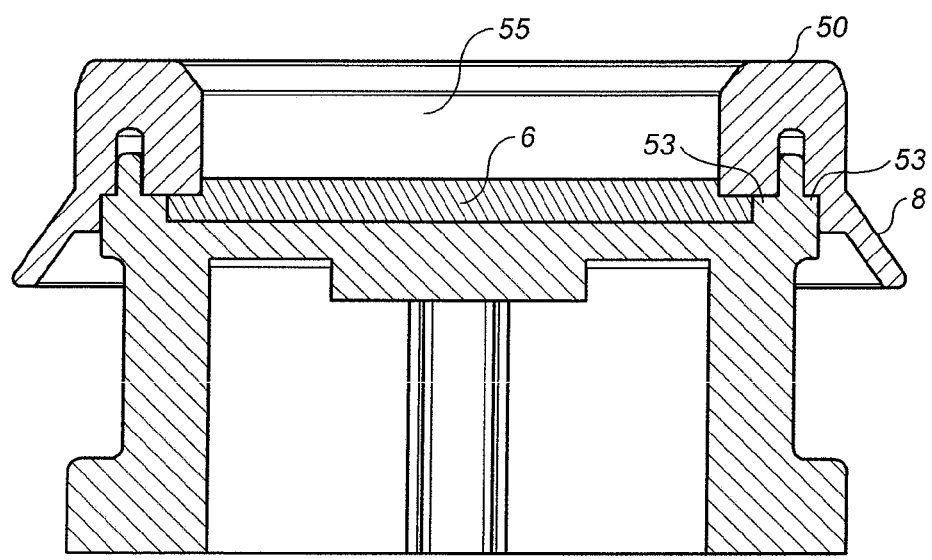
Figure 16C:
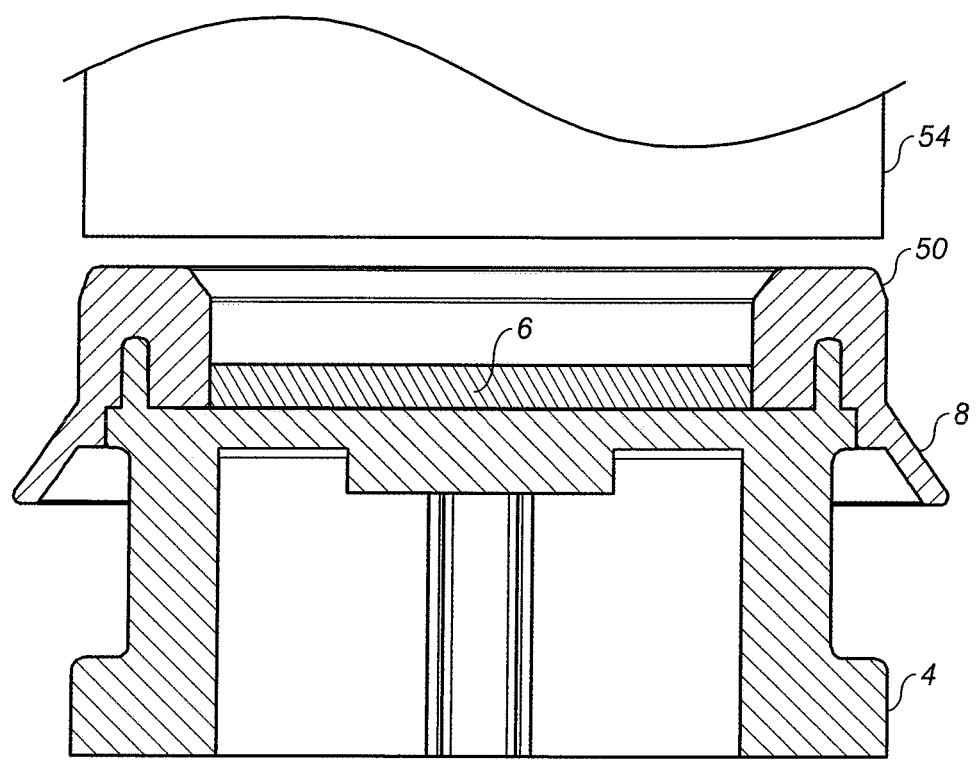

As shown in FIG. 16a, the filter membrane 6 is cut and placed onto the plunger body 4. The external ring 50 is then located on the plunger body 4 as shown in FIG. 16b. Energy directors in the form of annular protrusions 53 are located on either side of the boss 52; the external ring 50 is located on the plunger body 4 so that the external ring 50 sits on the annular protrusions 53. Finally, as shown in FIG. 16c an ultrasonic welding horn 54 is used to apply ultrasonic vibrations to the annular protrusions 53, causing them to melt, thereby permanently sandwiching the filter membrane 6 between the external ring 50 and the plunger body 4.

Since the external ring 50 is larger than a conventional internally fitting retaining ring 7, it is easier to handle during assembly of the plunger assembly 2. Further, the locating recess 51, in conjunction with the boss 52 on the plunger body 4 makes the external ring 50 considerably easier to locate than the conventional internally fitting retaining ring 7. Additionally, in the case that the external ring 50 is ultrasonically welded to the plunger body 4, since ultrasonic welds can be formed on both the interior and the exterior of the plunger body 4, the filter membrane 6 can be more securely held in place than is the case with the internally fitting retaining ring 7.

In the embodiments described above with reference to FIGS. 16a to 16c, the locating boss 52 is located on the plunger body 4 and the locating recess 51 is located on the external ring 50. However, in some embodiments, the plunger body 4 has a locating recess and the external ring has a locating boss. Alternatively or additionally, other locating means could be used; for example one of the first locating means and the second locating means could comprise a set of one or more holes with the other comprising a set of one or more corresponding stakes.

A further advantage of using the external ring 50 is that features such as the liquid seal 8 can be formed as part of the external ring 50. When the plunger body 4 and liquid seal 8 are integrally formed as part of a single mould, the parting line typically runs along the length of the plunger body 4 and therefore runs across the liquid seal 4; this can result in a protrusion or other uneven portion being formed on the liquid seal 8, reducing its effectiveness. However, when the liquid seal 8 is formed as part of the external ring 50 (and therefore separately to the plunger body 4), the parting line forms around the circumference of the external ring 50; accordingly, the parting line can be arranged so that it does not cross any part of the liquid seal 8, thereby improving the reliability of the liquid seal 8.

Figure 17:
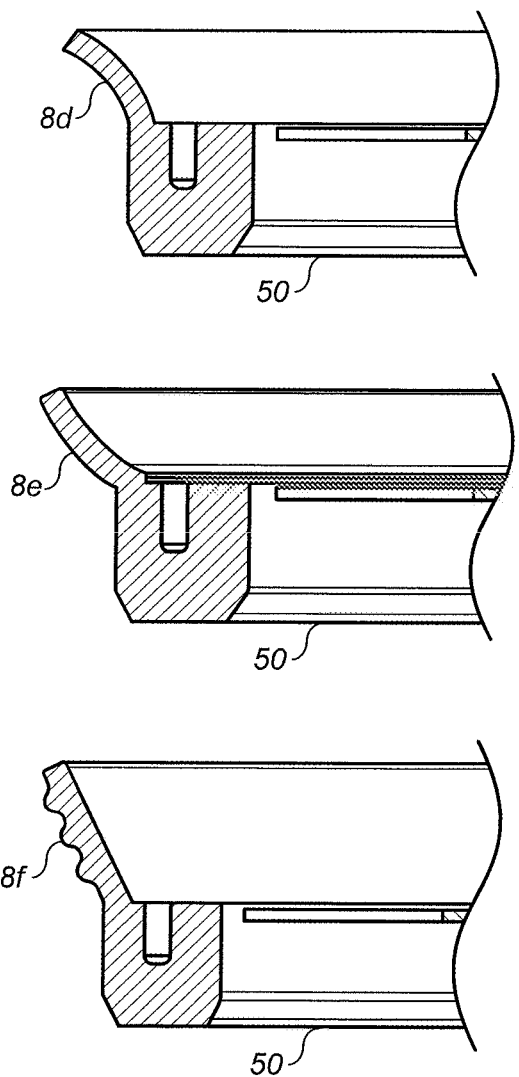
FIG. 17 shows cross-sectional views of three alternative filter fitting rings.

In addition, since liquid seals 8 having profiles that which extend away and upwards from the plunger assembly 2 are difficult to form as part of a single moulded plunger body, since the corresponding parts in the plastic mould extend in a direction away from the plastic flow. However, this problem does not arise in the case of a liquid seal 8 formed as part of external ring 50. Liquid seals 8d, 8e, 8f such as those shown in FIG. 17 can thus easily be formed as part of an external ring 50. Liquid seals 8 such as those shown in FIG. 17 may be advantageous when using vials with a consistent diameter from vial to vial (such as ground and/or polished glass vials). Alternatively, a liquid seal 8 as described above with reference to any of FIG. 9a to FIG. 11 b may be formed as part of the external ring 50.

Figure 18:
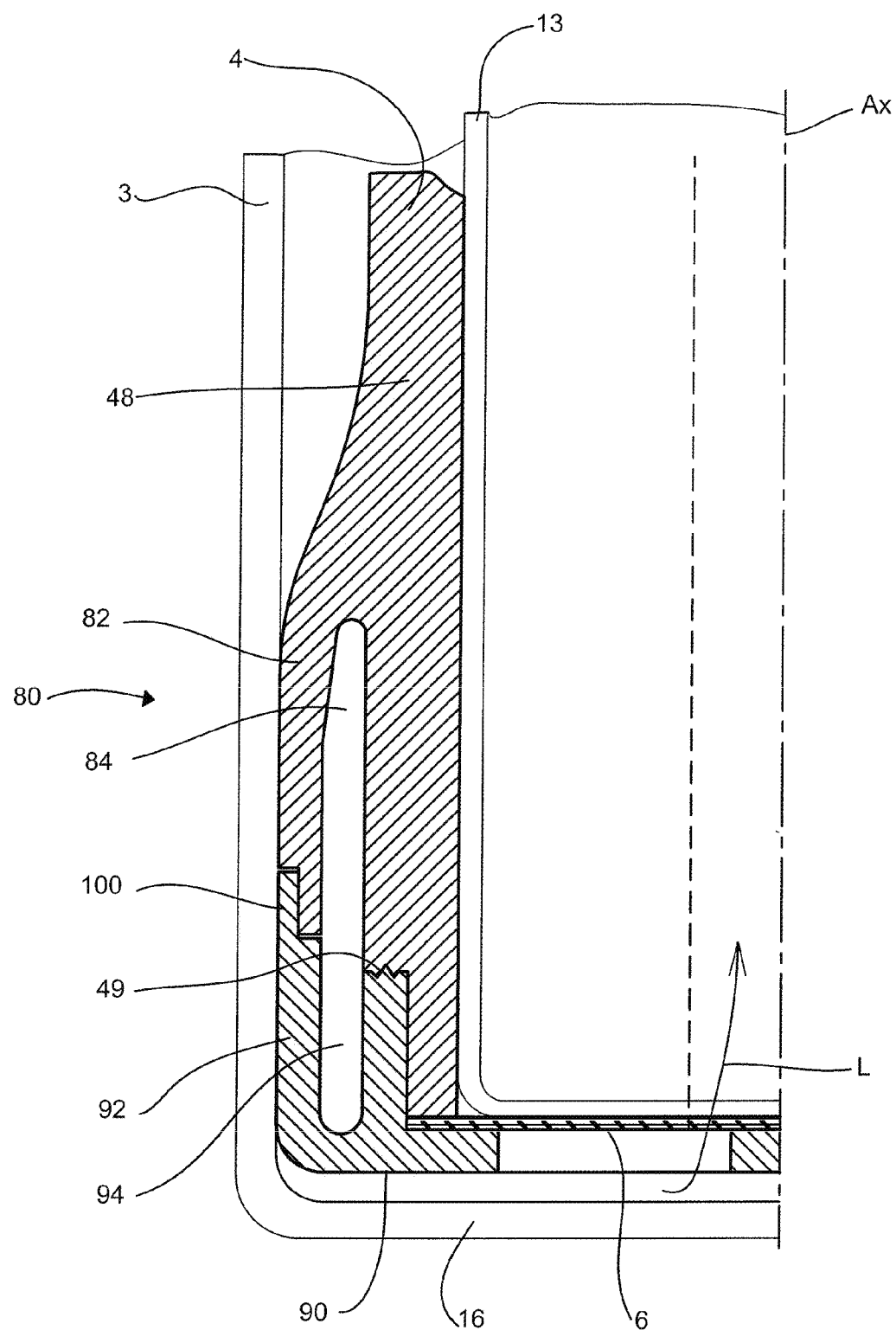
FIG. 18 shows a modified seal arrangement for use in the embodiments described below.

In FIG. 18 an alternative seal arrangement 80 is generally illustrated in section, showing only half of the arrangement, the other half being a mirror image about a central axis Ax. In this Figure, a liquid receptacle in the form of a glass vial 3, a plunger 4, a filter membrane 6 and closed tube filtrate chamber 13c are arranged generally as described above. The plunger 4 is shown close to the bottom of its intended travel, and near to the closed end 16 of the glass vial 3. The travel of the plunger 4 causes any liquids in the vial to flow in the direction of arrow L upward, through the filter 6, around the receptacle 13c and over the mouth (not shown) of the chamber 13c, in a manner similar to that shown in FIG. 12a. It will be noted that, in this arrangement, a majority of the liquids in the vial will forced upwardly, because the space occupied by the plunger matches substantially the internal volume of the vial at its closed end 16. Space for liquids to fill, which avoids their collection in the filtrate chamber 13c is known as dead space.

The arrangement of a plunger liquid seal 80 influences dead space. In this arrangement, the plunger 4 includes a body 48, and a first skirt 82 extending toward the closed end 16. The skirt 82, in this arrangement, is moulded plastics, integrally formed with the plunger body 48. There is an annular separation 84 between the skirt 82 and the body 48. This separation provides a resiliently deformable skirt which will inherently press against the side wall of the vial 3 and provide a seal because it has been manufactured to be slightly larger than the internal diameter of the vial 3.

In addition, the plunger body includes also a plunger cap 90, which is ultrasonically welded at an annular weld area 49. The cap 90 clamps the filter 6 in place when the cap is secured in place by said welding. The cap 90 includes a further (second) skirt 92 depending from the cap at an area close to the bottom of the plunger, and extending upwardly toward the first skirt. Again there is an annular separation 94 between the skirt 92 and the plunger body 48, which body includes the cap 90. The annular separation 94 allows further resilient sealing.

The skirts 82 and 92 overlap at an overlapping area 100. The skirts 82 and 92 have outer sealing surfaces which have no protrusions or recesses so together provide a generally constant annular surface which exert sealing forces on the side wall of the vial 3 spread over an area, rather than exerting point or line contact on the vial, and so reduce the stresses on the vial 3.

The above embodiments are to be understood as illustrative examples of the invention. Further embodiments of the invention are envisaged. For example, although the liquid seals 8, 80 were described above as being formed integrally with the plunger body 4, in some cases they may be formed separately and subsequently attached to the plunger body 4 or other part of the plunger assembly 2. Additionally or alternatively, the liquid seals could be made of a different material (for example, a different plastics material) from the plunger body 4. It is also possible that so called 'over-moulding' is employed, whereby a second plastics material is moulded over a moulding formed from a first plastics material in order to provide an over-moulded portion having different material characteristics to the first material.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A filtration device for use in filtration of a liquid, comprising:
 a liquid receptacle including an open end and a closed end;
 a plunger body moveable at least partially within the liquid receptacle along an axis, said axis extending between said open and closed ends, said plunger including a filtrate chamber in fluid communication with the liquid receptacle via a fluid filtering path and a filter disposed in the fluid filtering path;
 a slidable seal which inhibits or prevents fluid flow across the seal during plunger movement; and
 a plunger cap attached to the plunger body;
 wherein the seal comprises a first skirt that depends from the plunger, extends towards the closed end, and extends generally parallel to the axis,
 wherein the plunger cap comprises a second skirt that extends towards the open end and the first skirt,
 wherein an annular separation space extending parallel to the axis separates the first and second skirts from the plunger body when the first and second skirts are in an uncompressed state, and
 wherein the first and second skirts are arranged to interface with the liquid receptacle during plunger movement.

2. The filtration device of claim 1, wherein the second skirt has an outer surface which in use slidably and sealingly abuts the liquid receptacle vial.

3. The filtration device of claim 2, wherein the outer surfaces of the first skirt, or the second skirt, or both skirts form a substantially annular surface without protrusions.

4. The filtration device of claim 1, wherein said first and/or second skirts are elastically deformable for fitting within the liquid receptacle.

5. The filtration device of claim 1, wherein said first and second skirts overlap.

6. The filtration device of claim 1, wherein the cap is attached to the plunger body and clamps the filter in place when so attached.

7. The filtration device of claim 1, wherein the first and/or second skirt is integrally formed with the plunger body.

8. The filtration device of claim 1, wherein said plunger body and said skirts are formed using a plastics injection moulding process.

9. The filtration device of claim 1, wherein the plunger body comprises an aperture at said first end, and the filter is located at said aperture.

10. The filtration device of claim 1, wherein said liquid receptacle is tapered outwards at said open end.

11. The filtration device of claim 10, wherein said liquid receptacle is made of a glass material.

12. The filtration device of claim 11, wherein the liquid receptacle is formed using a blowing process.

13. The filtration device of claim 5, wherein the second skirt lies over the first skirt at the overlap.

* * * * *